United States Patent
Sato et al.

(10) Patent No.: US 6,934,225 B2
(45) Date of Patent: Aug. 23, 2005

(54) DISC CARTRIDGE AND DISC RECORDING AND/OR REPRODUCING APPARATUS

(75) Inventors: Masahiro Sato, Kami-gun (JP); Ikuo Nitta, Kami-gun (JP); Yuji Takahashi, Kami-gun (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/393,994

(22) Filed: Mar. 24, 2003

(65) Prior Publication Data

US 2003/0179661 A1 Sep. 25, 2003

Related U.S. Application Data

(62) Division of application No. 09/987,552, filed on Nov. 15, 2001, now Pat. No. 6,600,702.

(30) Foreign Application Priority Data

Nov. 17, 2000 (JP) ........................................ 2000-350520

(51) Int. Cl.⁷ ............................ G11B 21/08; G11B 7/085
(52) U.S. Cl. .................................................. 369/30.68
(58) Field of Search ..................... 369/30.68, 75.11, 369/75.21, 77.11, 77.21, 30.65, 30.64, 30.03, 30.01, 24.01, 30.7, 30.72, 30.83, 30.85, 75.1, 75.2, 77.1, 77.2; 720/629, 622, 614, 613

(56) References Cited

U.S. PATENT DOCUMENTS

| | | | |
|---|---|---|---|
| 4,980,883 A | 12/1990 | Mutou et al. | 369/291 |
| 5,123,001 A | 6/1992 | Nakamichi et al. | 369/30.07 |
| 5,247,500 A | 9/1993 | Miyoshi et al. | 369/30.85 |
| 5,831,948 A | * 11/1998 | Suzuki | 369/30.85 |
| 5,844,880 A | * 12/1998 | Motoki et al. | 720/614 |
| 5,870,358 A | 2/1999 | Kim et al. | 369/30.85 |
| 5,889,754 A | * 3/1999 | Philipps et al. | 369/30.77 |

* cited by examiner

Primary Examiner—Julie Anne Watko
(74) Attorney, Agent, or Firm—Oblon, Spivak, McClelland, Maier & Neustadt, P.C.

(57) ABSTRACT

A disc cartridge provided with: a plurality of trays, each of which can place a disc; and a case where those trays can be taken in and out of an opening, wherein an operating unit is disposed in each of the trays, a guide rail is disposed in either one of the trays and the case in a direction in which the trays are taken in and out of the case, and a fitting unit is disposed in the other of the trays and the case so as to be fit in the guide rail in order to guide the trays along this guide rail, and when the trays are taken in and out of the case, they can be smoothly taken in and out in such a way that the trays are not caught by the case, and a disc recording and/or reproducing apparatus having such a disc cartridge.

28 Claims, 26 Drawing Sheets

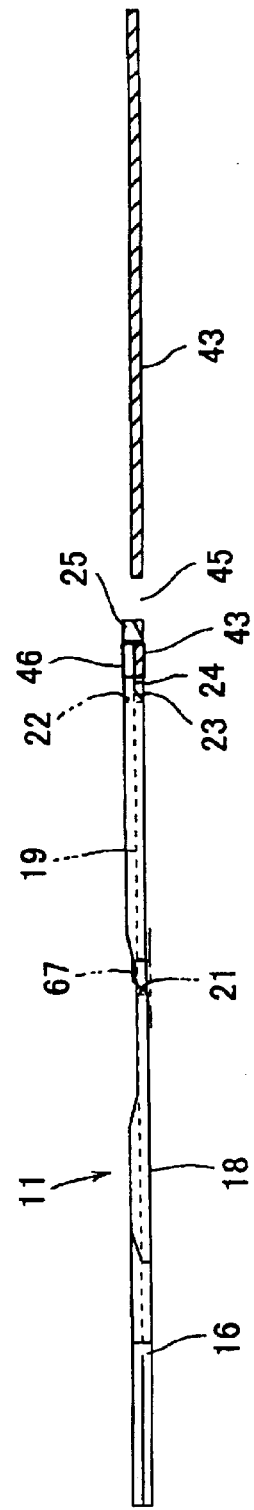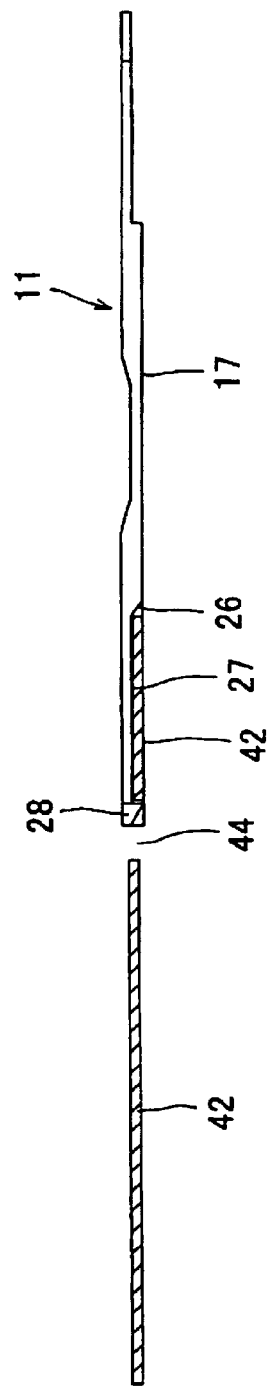

DISC CARTRIDGE AND DISC RECORDING AND/OR REPRODUCING APPARATUS

This application is a Division of application Ser. No. 09/987,552 Filed on Nov. 15, 2001, now U.S. Pat. No. 6,600,702.

CROSS REFERENCES TO RELATED APPLICATIONS

The present document is based on Japanese Priority Document JP 2000-350520, filed in the Japanese Patent Office on Nov. 17, 2000, the entire contents of which being incorporated herein by reference.

BACKGROUND OF THE INVENTION

1. Field of the Invention

The present invention relates to: a disc cartridge provided with a plurality of trays each holding a disc, and a cartridge case assembled so as to enable those trays to be taken in and out, in which an operating unit disposed in the tray is drawn or pressed to thereby take the tray in and out; and a disc recording and/or reproducing apparatus (hereafter, referred to as a disc auto-changer) for recording on and/or reproducing from the disc on the tray by using the disc cartridge.

2. Description of the Related Art

A disc cartridge shown in FIG. 32 is known as the above-mentioned disc cartridge (also referred to as a disc magazine). The disc cartridge 201 is provided with a plurality of trays 203 each holding a discoid recording medium (hereafter, referred to as a disc) 202; and a cartridge case 204 assembled so as to enable those trays 203 to be taken in and out, in which an operating unit 205 (hereafter, referred to as a hook) disposed in the tray 203 is drawn or pressed to thereby take the tray 203 in and out of the cartridge case 204.

The disc cartridge 201 is used in such a way that the respective trays 203 are taken out of the cartridge case 204, and the respective discs 202 are placed thereon. The disc cartridge 201 is loaded into a disc auto-changer (not shown in FIG. 23) in a condition that the trays 203 are returned back to the case 204.

As shown in FIG. 33, the disc auto-changer 301 is provided with: a cartridge loader 302 for loading the disc cartridge 201; an elevating unit, namely, an elevator 303 arranged opposite to an opening of the cartridge loader 302; and an elevating control mechanism 304 for vertically elevating the elevator 303 along one side of the disc cartridge 201.

After the elevating control mechanism 304 moves the elevator 303 to a position corresponding to a tray 203 on which a desired disc 202 is placed, a loading mechanism 305 disposed in the elevator 303 pulls the tray 203 into the elevator 303. Then, as shown in FIG. 34B, the disc 202 on the tray 203 is placed on a turn table 306, and chucked by a chucking plate 307. After that, a disc recording and/or reproducing unit composed of an optical pickup and the like mounted on the elevator 303 records on and/or reproduces from the disc.

By the way, in the case of the disc cartridge 201 and the disc auto-changer 301, as shown in FIG. 35, left and right sides 204a, 204b of the cartridge case 204 and left and right sides 303a, 303b of the elevator 303 serve as guide planes of the tray 203. The tray 203 is slid while it is guided by those guide planes. This results in the following problems.

(1) If a moment in a direction indicated by an arrow M (a direction in which the tray is inclined to a direction A where it is taken in and out) is applied in pulling the hook 205 of the tray 203, the side 203a of the tray 203 is pushed against the side 204a of the cartridge case 204. Thus, a smooth slide of the tray 203 is impeded. In the worst case, the tray 203 is caught by the side 204a, and it is stopped.

(2) Since a distance L between the guide planes is long, a dimensional tolerance between the guide planes is large. Thus, in order to attain an excellent guide effect, management of components is difficult.

SUMMARY OF THE INVENTION

The present invention is proposed in view of the above-mentioned circumstances and is to smoothly slide the tray even if a moment in a tray rotation direction is applied to the hook of the tray, and easily carry out the dimensional management of the parts and the like.

According to the present invention, since a slide guide is disposed at a position aligned in substantial series with a hook of a tray with respect to a direction, in which the tray is taken in and out, in a disc cartridge and an elevator, even if a moment in a tray inclination direction is applied to the hook in drawing the hook or in other cases, an inclination of the tray can be minimized to smoothly slide the tray.

In the disc cartridge according to the present invention, the fitting between the guide rail disposed in either of the tray or the case and the fitting unit disposed in the other tray or case enables the tray to be smoothly taken in and out. In addition, the slide guide is disposed in substantial series with the direction, in which the tray is taken in and out, with respect to the operating unit (hook) of the tray. Thus, even if a moment in the tray inclination direction is applied to the operating unit when the tray is taken in and out, the inclination of the tray can be minimized to smoothly slide the tray. Also, as compared with the conventional case in which the slide of the tray is guided between the left and right sides of the cartridge case, the width of the guide plane can be reduced to thereby make a management of a part size and the like easier. Furthermore, in the disc cartridge according to the present invention, the slide guide is composed of the grooved concave portion on the reverse side of the tray and the ligulate convex portion on the cartridge case side. Thus, the structure of the slide guide is simple. Also, when the tray and the cartridge case are molded from plastic, the concave portion and the convex portion can be formed integrally with them. In addition, the divergently tapered concave portion insertion guide (tapered surface) is disposed at the end of the grooved concave portion. Thus, due to the guide, the convex portion can be inserted into the grooved concave portion easily and surely.

In the disc recording and/or reproducing apparatus according to the present invention, the tray can be smoothly slid by guiding the slide of the tray not only in the cartridge case but also in the elevator. When the tray is pulled out of the disc cartridge, the ligulate convex portion serving as the slide guide formed on the elevator side is introduced into the grooved concave portion formed on the reverse side of the tray. Accordingly the convex portion guides the slide of the tray.

Furthermore, the disc recording and/or reproducing apparatus according to the present invention, the divergently tapered convex portion insertion guide formed at the end of the grooved concave portion formed on the reverse side of the tray enables the ligulate convex portion to be inserted into the grooved concave portion easily and surely. In addition, when the trays are pulled into the elevator by the predetermined amount, the ligulate convex portion serving as the slide guide formed on the elevator side is put in the notch hole made in the substantial center of the grooved concave portion. Accordingly, the tray can be lowered correspondingly to it. Thus, after the disc supported on the tray is placed on the disc table, the tray is lowered, which leads to the non-contact state between the disc and the tray. Then, the disc can be rotated.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 12 is a sectional view taken on a line XII—XII of the main portion of FIG. 10;

FIG. 13 is a sectional view taken on a line XIII—XIII of the main portion of FIG. 10;

DETAILED DESCRIPTION OF THE PREFERRED EMBODIMENTS

A disc cartridge and a disc recording and/or reproducing apparatus according to the present invention will be described below by using a disc auto-changer and a disc cartridge used therein as an example. This description will be divided into respective items of: (1) an explanation of an outline of the disc auto-changer; (2) an explanation of the disc cartridge; (3) an explanation of an elevator; (4) an explanation of an elevating control mechanism; (5) an explanation of a loading mechanism; (6) an explanation of a disc chucking mechanism; (7) an explanation of an entire operation of the disc auto-changer; and (8) an explanation of another embodiment of the elevating control mechanism. Then, the divided items are described in the above-mentioned order.

(1) Explanation of Outline of Disc Auto-Changer

Figure 1:
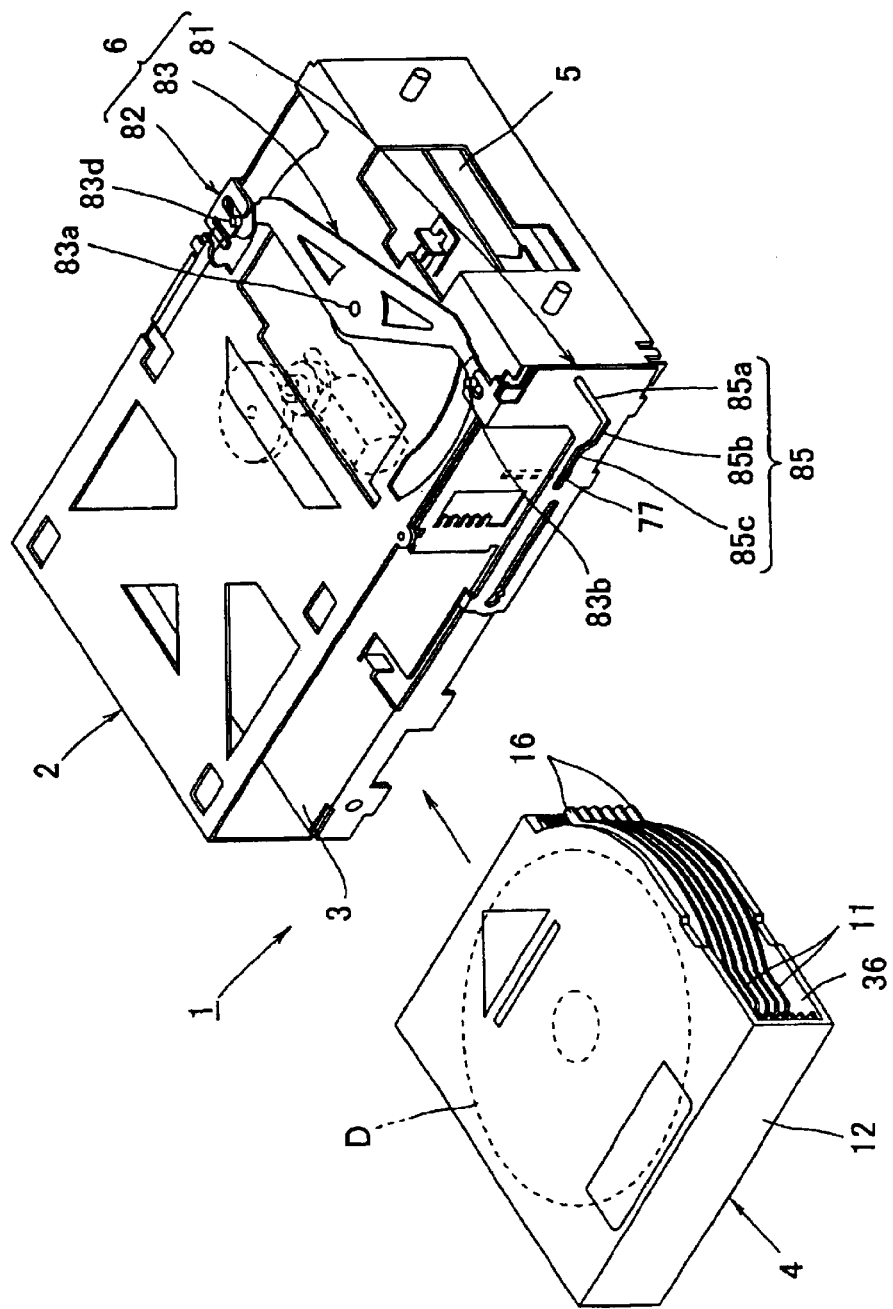
FIG. 1 is a perspective view of a disc auto-changer of the present invention.

FIG. 1 is a perspective view of a disc auto-changer 1. The disc auto-changer 1 is provided with: a disc cartridge 4 having a plurality of disc placing trays 11 to be loaded into a cartridge accommodating unit 3 of a mechanical chassis 2; an elevating unit (hereafter, referred to as an elevator) 5 arranged on a side of the cartridge accommodating unit 3; an elevating control mechanism 6 for elevating the elevator 5 along an opening 36 of the disc cartridge 4 loaded in the cartridge accommodating unit 3; a loading mechanism 7 (refer to FIG. 23) for receiving and sending a tray between the disc cartridge 4 and the elevator 5; and a disc chucking mechanism 8 (refer to FIG. 14) for chucking the disc on the tray 11, which is fed to a side of the elevator 5 by the loading mechanism 7, onto a disc table. The elevator 5 is raised and lowered to a position of a desired tray 11 of the disc cartridge 4. The desired tray 11 is fed to the side of the elevator 5 by the loading mechanism 7. After that, a disc D placed on the tray 11 is chucked onto the disc table by the disc chucking mechanism 8. In this way, the disc recording and/or reproducing operation is carried out.

(2) Explanation of Disc Cartridge

Figure 2:
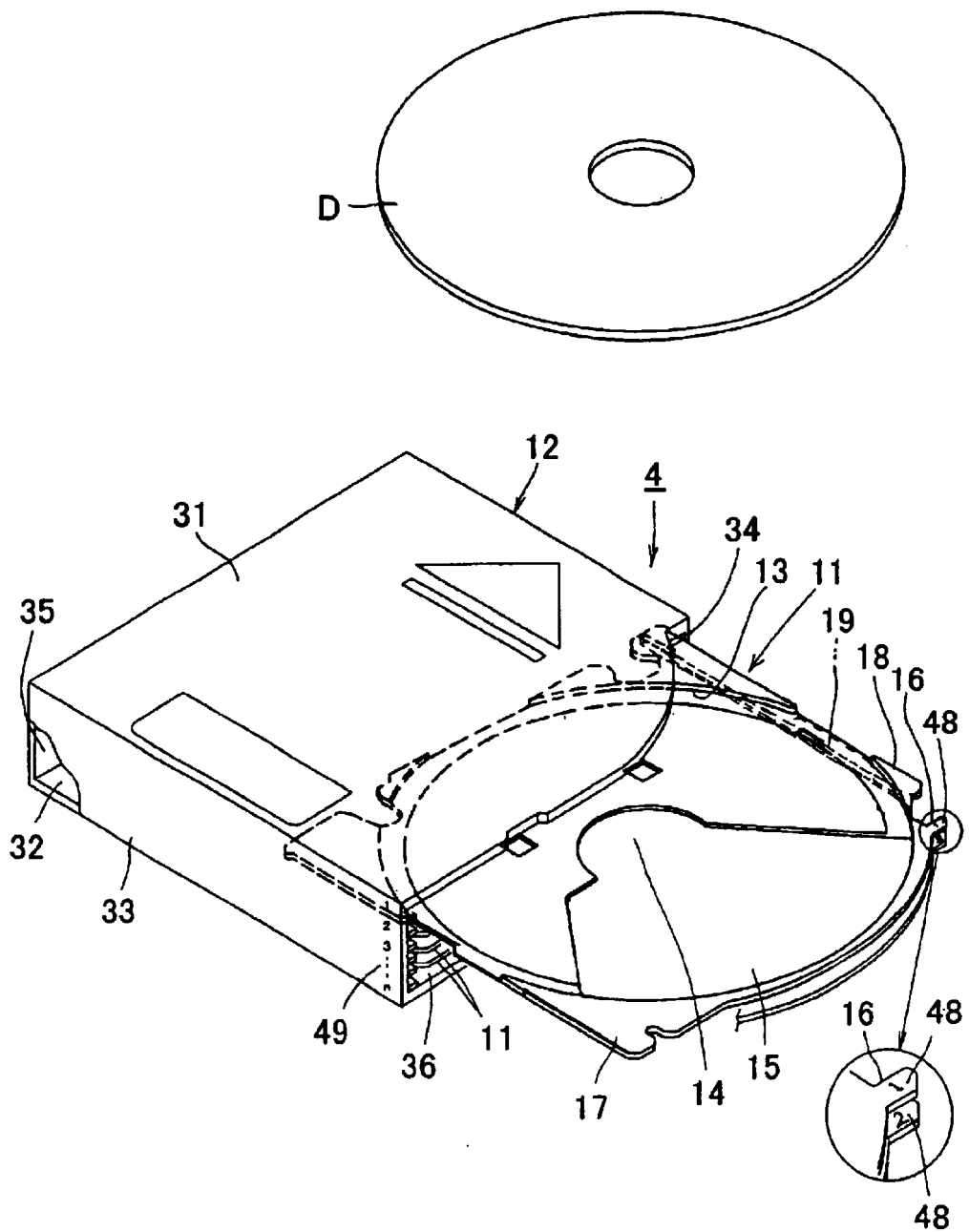
FIG. 2 is a perspective view of a disc cartridge.

FIG. 2 is a perspective view of the disc cartridge 4. The disc cartridge 4 has a plurality of trays 11 on which discs D are placed, and a case 12 assembled so as to enable those trays 11 to be pulled out.

The tray 11 has a disc positioning concave portion 13 so as to place the disc D in an engaged state. From a center of the concave portion 13 to one side portion, it has a notch 14 for disc table introduction and a notch 15 for pickup movement. Also, an operating unit 16 (hereafter, referred to as a hook) in which a tray fitting unit (hereafter, referred to as a hook fitting unit) 91 of the later-described loading mechanism 7 is fit is installed in one side of a front end (pulled out end) side of the tray 11.

A top surface of the hook 16 of each of the trays 11 serves as an address indicator 48 for indicating the number of the tray at which the tray is positioned from the uppermost tray (or from the lowermost tray). A serial number from 1 to n in order starting from the uppermost tray is indicated on the address indicator 48.

Also, an address indicator 49 for indicating the number of that tray is installed even at a position corresponding to each tray from the uppermost tray to the lowermost tray on one side of the case 12. A serial number from 1 to n is given to the address indicator 49, similarly to the case of the above-mentioned tray.

Figure 3:
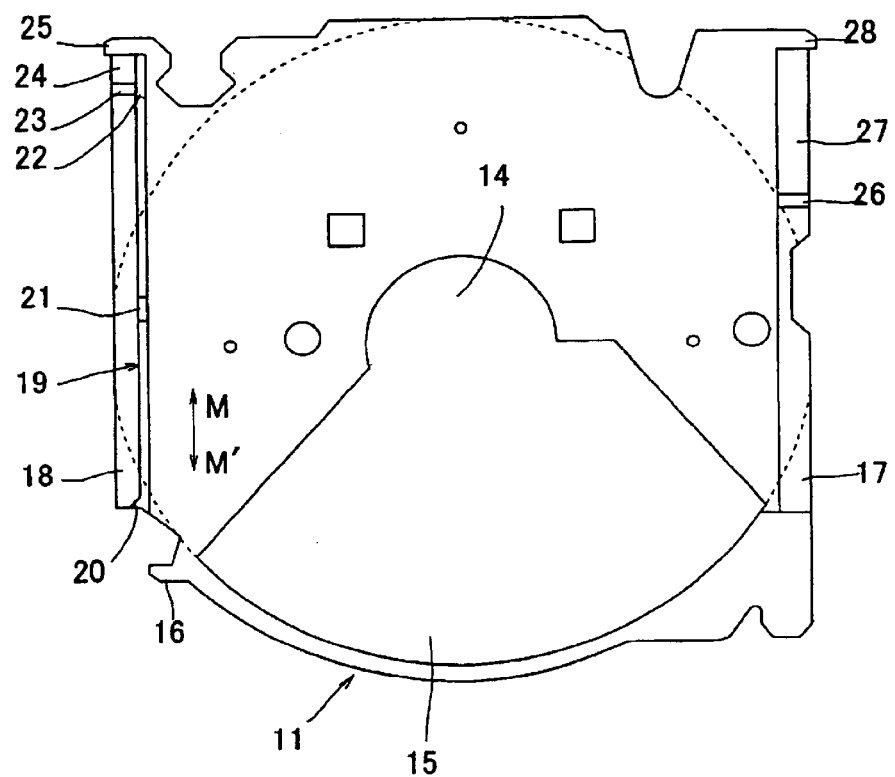
FIG. 3 is a plan view of a disc tray when it is seen from a reverse side of the disc tray.

FIG. 3 is a plan view of the tray 11 when it is viewed from its turned over direction. The tray 11 has, on left and right sides of a rear thereof, first and second supported members 17, 18 supported by a pair of first and second tray supporters 42, 43 in a form of a rack, which are disposed in the case 12 described below.

A slide guide 9 (refer to FIG. 4) for guiding a slide of the tray is disposed between the second supported member 18 and the second tray supporter 43 for supporting it. The slide guide 9 is composed of: a guide rail disposed on a bottom surface of the second supported member 18 of the tray 11, namely, a long grooved concave portion 19; and a fitting unit formed on a top surface of the second tray supporter 43 of the case 12, namely, a ligulate convex portion (hereafter, referred to as a first guide protrusion) 46. As shown in FIG. 3, the long grooved concave portion 19 is formed near the hook 16. In particular, it is desired to be formed on the substantially same line as the hook 16, with respect to a direction M–M' in which the tray is taken in and out, and also near the hook 16, such as this embodiment.

The long grooved concave portion 19 has a divergently tapered protrusion insertion guide 20 at an end on a side of the hook 16, and has a first hole 21 at a center and a second hole 22 at the other end. Also, the second supported member 18 has a downwardly slant plane 23 on a side of the second hole 22, a first dent portion 24 connected to the slant plane 23, and a first stopper 25 connected to the first dent portion 24.

The first supported member 17 also has a downwardly slant plane 26, a second dent portion 27 connected to the slant plane 26, and a second stopper 28 connected to the second dent portion 27, similarly to the second supported member 18.

As shown in FIG. 2, the case 12 is constituted in a form of a compressed box by a top surface plate 31, a bottom surface plate 32, a left side surface plate 33, a right side surface plate 34 and a rear surface plate 35 so that the trays 11 are taken in and out of an opening 36 of a front edge.

The case 12 is designed such that one side of the opening 36 is cut away to accordingly exhibit a so-called rounded-off condition, and the hooks 16 of the trays 11 are exposed to external portion of the case 12 from the rounded-off portion.

Figure 4:
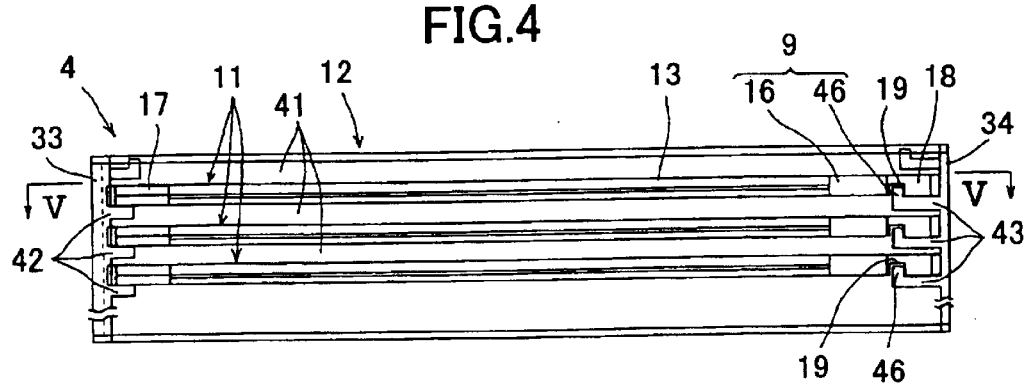
FIG. 4 is a front view of the disc cartridge.

FIG. 4 is a front view of the disc cartridge 4. The case 12 has a plurality of disc accommodating units 41 for accommodating the trays 11 in such a way that they can be pulled in and out. The disc accommodating unit 41 is configured by disposing the pair of first and second tray supporters 42, 43 in the form of the shelf at positions opposite to each other on inner surfaces of the left and right side surface plates 33, 34.

Figure 5:
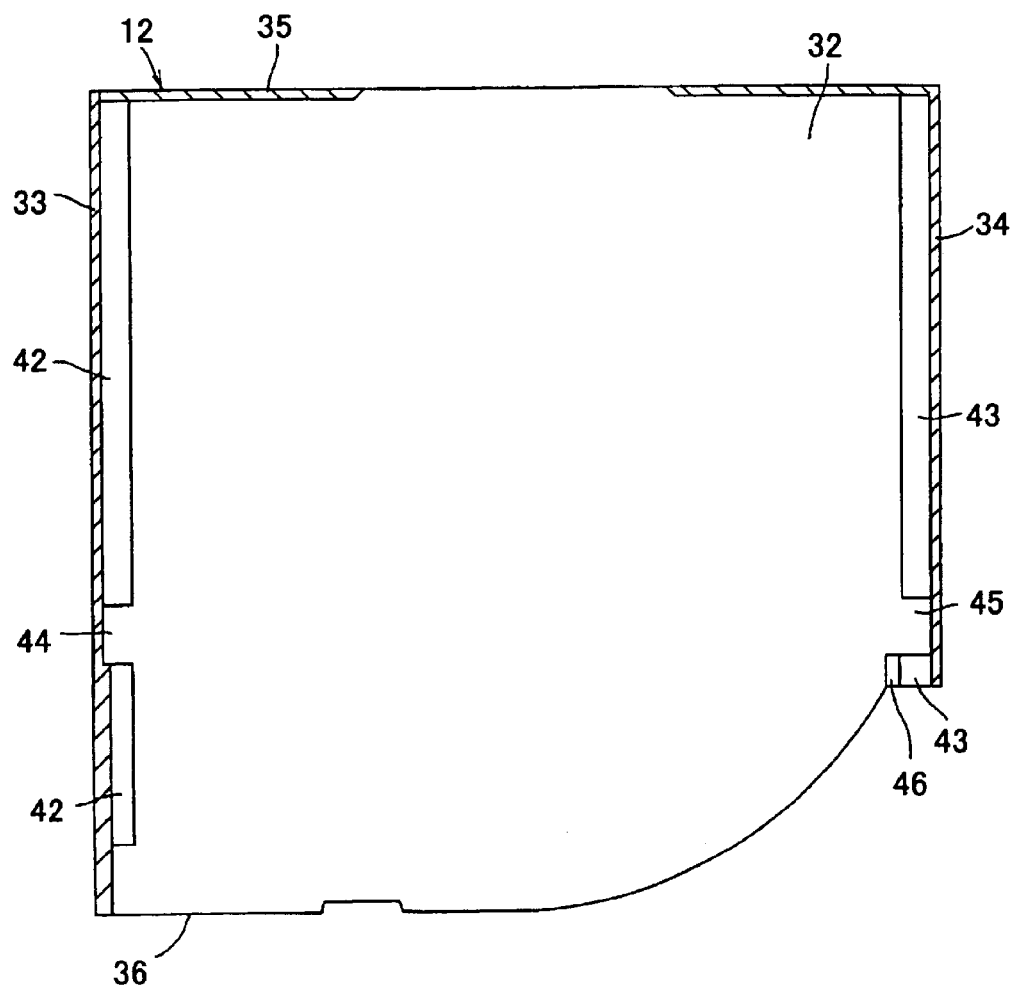
FIG. 5 is a sectional view taken on a line V—V after the trays are taken out.

FIG. 5 is a sectional view taken on a line V—V after the trays 11 of FIG. 4 are taken out. The first and second tray supporters 42, 43 horizontally support the first and second supported members 17, 18 of the tray 11, as mentioned above.

The first tray supporter 42 has a first notch 44 close to the front end (opening 36) rather than a center of a longitudinal direction. Also, the second tray supporter 43 has a second notch 45 at a position opposite to the first notch 44, and also has the first guide protrusion (ligulate convex portion) 46 inserted into the long grooved concave portion 19 formed on the bottom surface of the tray 11, on an inner side of the front end side. The first guide protrusion 46 is formed at a size in such a way that it can not be engaged with the first hole 21 made in the center of the concave portion 19, and it is formed at a size in such a way that it can be engaged with the second hole 22.

Figure 6:
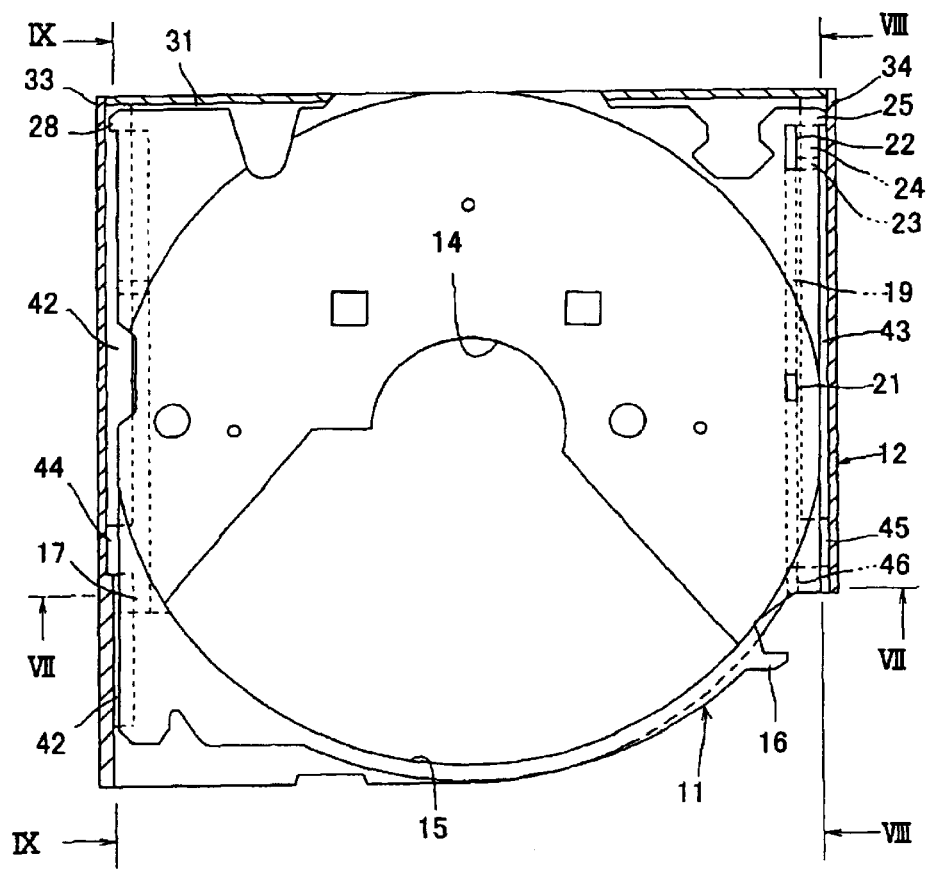
FIG. 6 is a sectional view taken on the line V—V in a condition that the trays are accommodated.
Figure 7:
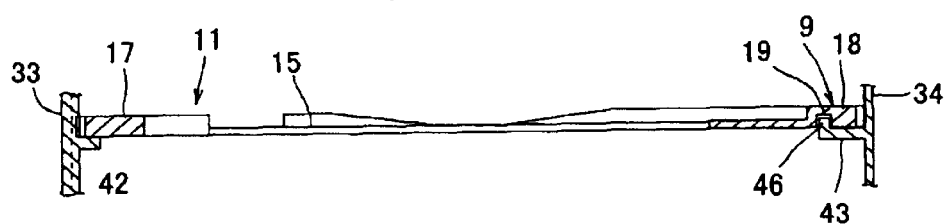
FIG. 7 is a sectional view taken on a line VII—VII of a main portion of FIG. 6.
Figure 8:
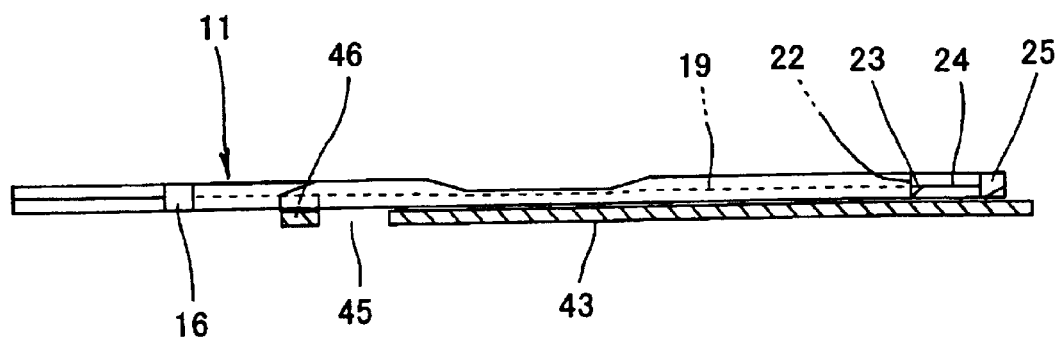
FIG. 8 is a sectional view taken on a line VIII—VIII of the main portion of FIG. 6.
Figure 9:
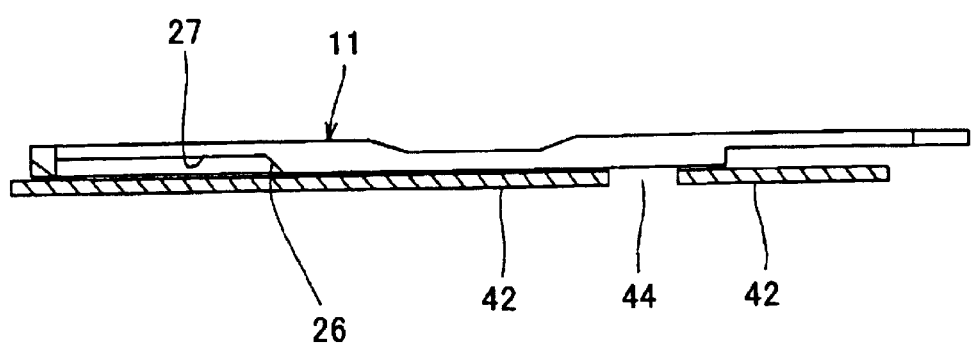
FIG. 9 is a sectional view taken on a line IX—IX of the main portion of FIG. 6.

FIG. 6 is a sectional view (a sectional view taken on the line V—V of FIG. 4) showing the condition that the tray 11 is accommodated in the case 12. FIG. 7 is a sectional view taken on a line VII—VII of a main portion of FIG. 6. FIG. 8 is a sectional view taken on a line VIII—VIII of the main portion of FIG. 6. FIG. 9 is a sectional view taken on a line IX—XI of the main portion of FIG. 6. In the condition that the tray 11 is accommodated in the case 12, the first and second supported members 17, 18 of the tray 11 are in a condition that they are placed on the first and second tray supporters 42, 43 of the case 12. Also, the first guide protrusion 46 formed on the second tray supporter 43 is engaged with the long grooved concave portion 19 formed on the tray 11. Accordingly, the slide guide 9 is configured as mentioned above.

If the tray 11 is drawn by placing a fingertip in the hook 16 of the tray 11 or by engaging the hook fitting unit 91 of the later-described loading mechanism 7 or by using other manners from the state shown in FIG. 6, the tray 11 is straightly pulled out of the case 12 without any inclination to the left and right directions by the long grooved concave portion 19 and the first guide protrusion 46.

Figure 10:
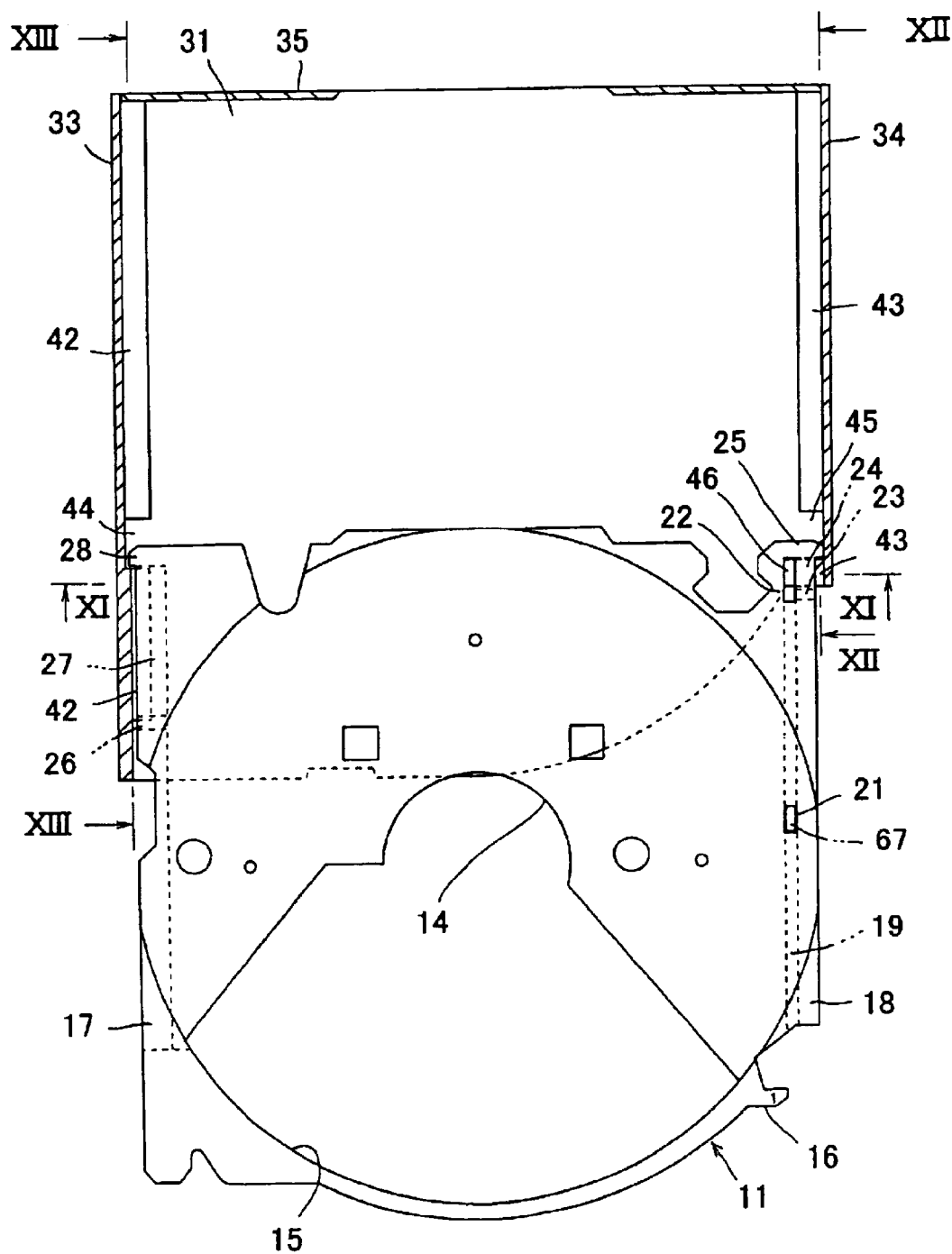
FIG. 10 is a plan view of a main portion of the disc cartridge in a condition that the tray is pulled out.
Figure 11:
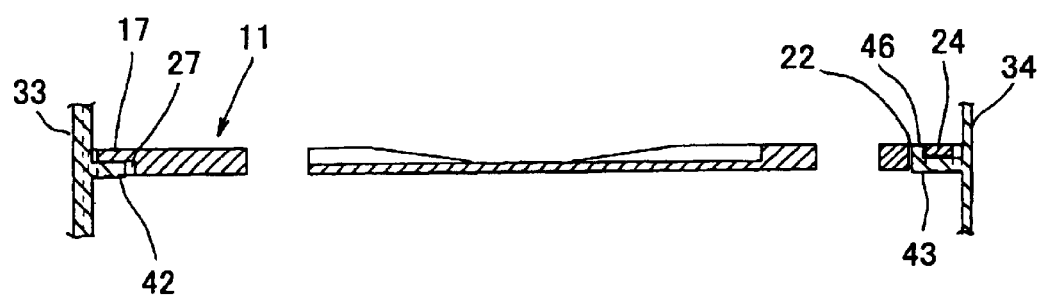
FIG. 11 is a sectional view taken on a line XI—XI of a main portion of FIG. 10.

FIG. 10 is a sectional view showing a condition when the trays 11 corresponding to FIG. 6 are pulled out of the case 12 by a predetermined amount. FIG. 11 is a sectional view taken on a line XI—XI of a main portion of FIG. 10. FIG. 12 is a sectional view taken on a line XII—XII of the main portion of FIG. 10. FIG. 13 is a sectional view taken on a line XIII—XIII of the main portion of FIG. 10. When the trays 11 are pulled out of the case 12 by a predetermined amount, the first and second stoppers 25, 28 of the tray 11 are introduced into the first and second notches 44, 45 formed on the first and second tray supporters 42, 43 of the case 12, and the first and second tray supporters 42, 43 located in a forward direction from the first and second notches 44, 45 of the case 12 are introduced into the first and second dent portions 24, 27 connected to the first and second stoppers 25, 28. Then, due to the first and second tray supporters 42, 43, the tray 11 becomes in a condition where top surfaces of the first and second dent portions 24, 27 are supported. Moreover, the guide protrusion 46 formed on the case 12 is engaged with the second hole 22 made on the tray 11. Thus, the tray 11 becomes in a condition that its fall from the case 12 is protected.

(3) Explanation of Elevator

The elevating unit, namely, the elevator 5 is arranged opposite to the opening 36 of the disc cartridge 4, and is raised/lowered to a desired disc accommodating unit, namely, a position of the tray by using the elevating control mechanism 6. A disc placed on the tray pulled out of the disc cartridge by the loading mechanism 7 is chucked onto the disc table by the disc chucking mechanism 8. Then, the disc recording and/or reproducing operation is carried out by a recording and/or reproducing unit composed of an optical pickup and the like.

Figure 14:
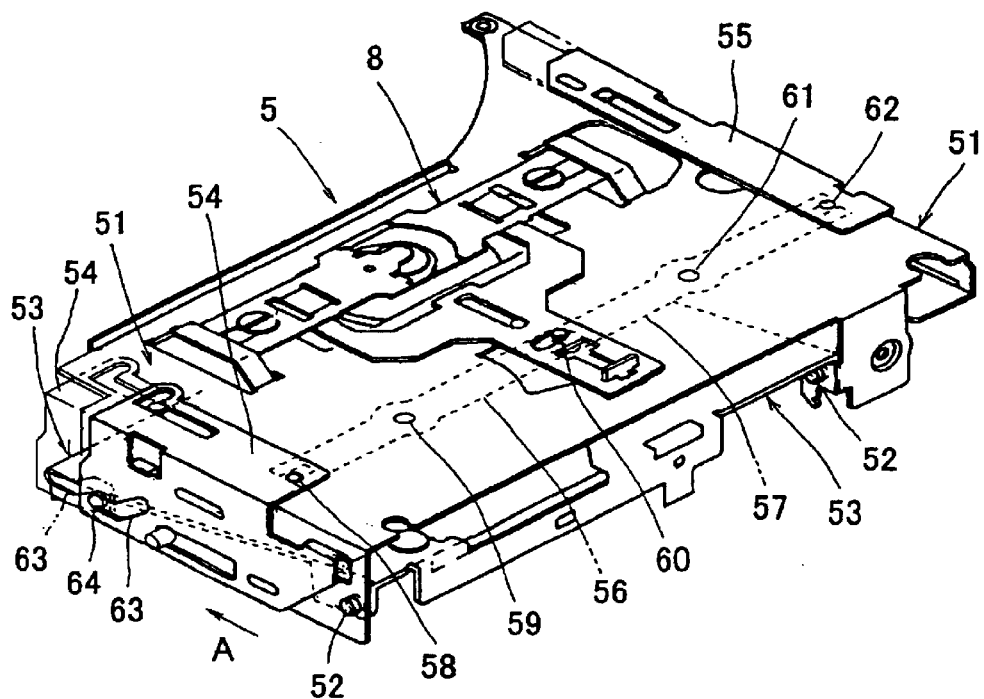
FIG. 14 is a perspective view of an elevator.
Figure 15:
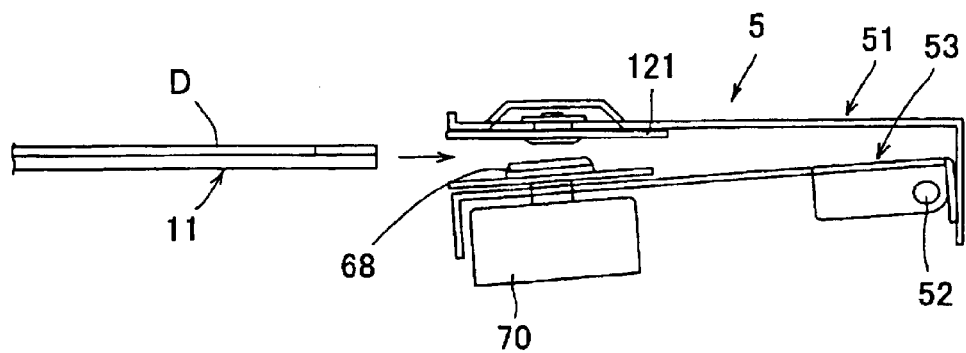
FIG. 15 is a sectional view of a main portion of the elevator.
Figure 16:
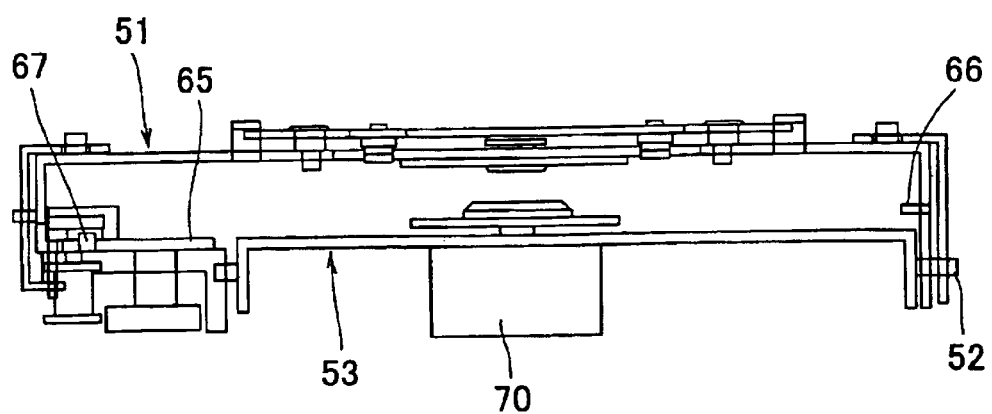
FIG. 16 is a front view of the main portion of the elevator.
Figure 17A:
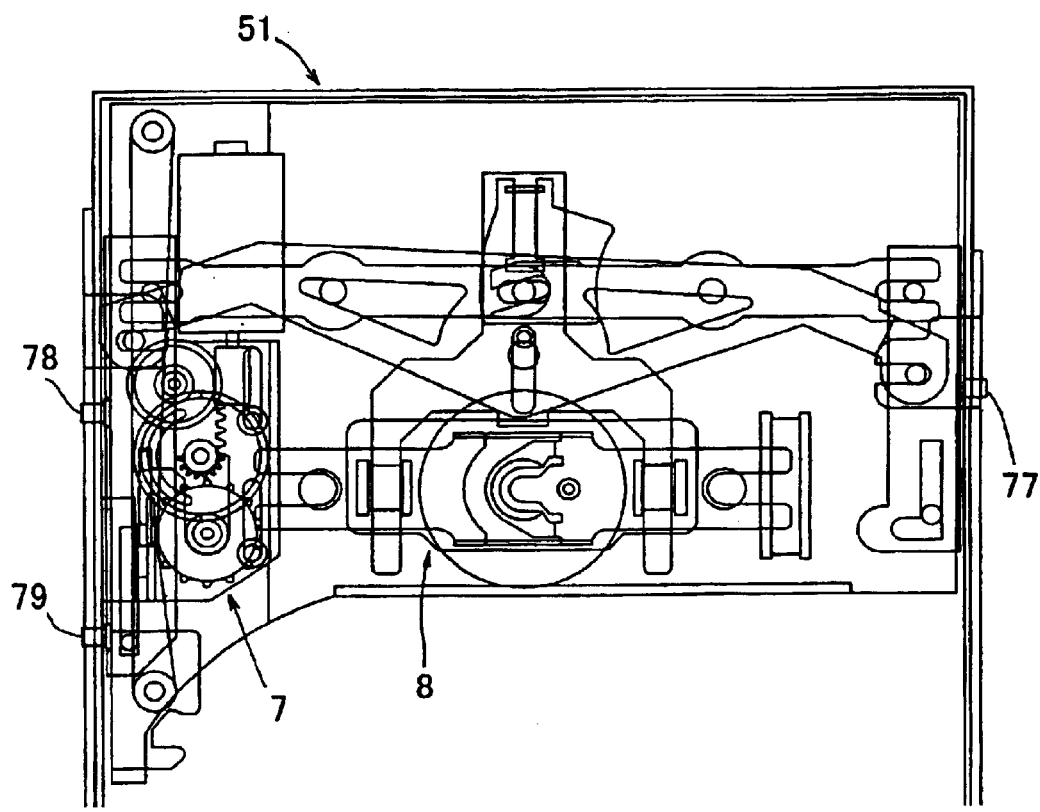
FIG. 17A is a plan view of an upper block of the elevator.
Figure 17B:
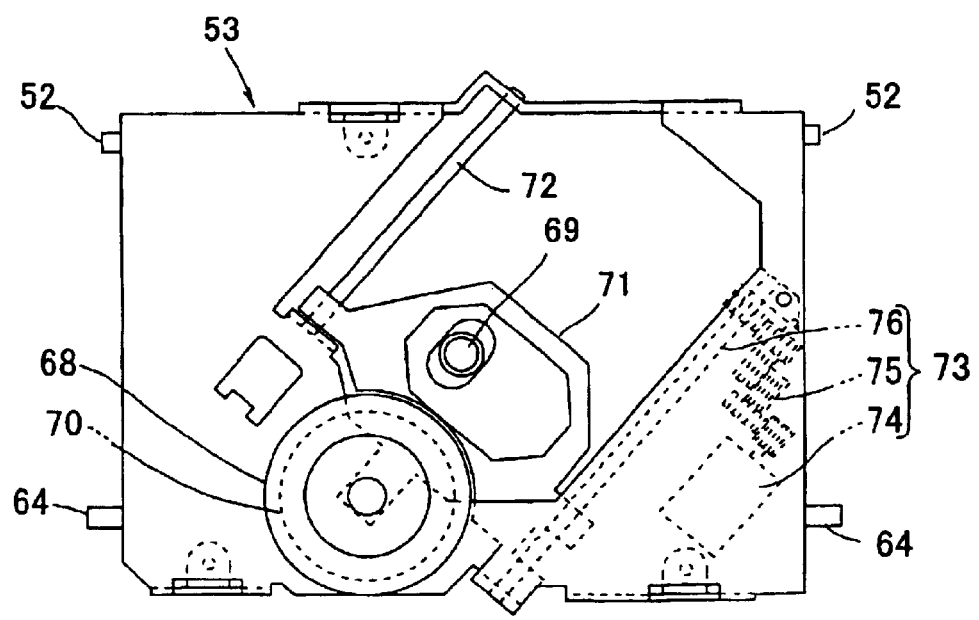
FIG. 17B is a plan view of a lower block of the elevator.

FIG. 14 is a perspective view of the elevator 5. FIG. 15 is a sectional view taken on a main portion of FIG. 14. FIG. 16 is a front view of the elevator 5. FIGS. 17A and 17B are plan views of an upper block and a lower block, respectively, constituting the elevator 5.

As shown in FIGS. 14, 15, the elevator 5 is provided with: an upper block 51; a lower block 53 rotatably installed through a first shaft 52 to the upper block 51; first and second lower block rotation operating units 54, 55 slidably installed to both sides of the upper block 51; and first and second link levers 56, 57 for linking the first and second lower block rotation operating units 54, 55 to each other and moving them in the same direction in synchronization with each other. In the first link lever 56, one end thereof is connected to the first lower block rotation operating unit 54 through a first pin 58. A center portion thereof is rotatably attached to a lower surface of the upper block 51 through a second pin 59. The other end is connected to one end of the second link lever 57 through a third pin (hereafter, referred to as a connecting pin) 60.

With regard to the second link lever 57, a center portion thereof is rotatably attached to a bottom surface of the upper block 51 through a fourth pin 61. The other end is connected to the second lower block rotation operating unit 55 through a fifth pin 62.

If any one of the first and second lower block rotation operating units 54, 55 is slid, the other unit is also slid to the same direction through the first or second link levers 56, 57.

Each of the first and second lower block rotation operating units 54, 55 has an inclined operation groove 63. A second shaft 64 disposed on the other end side (the end opposite to the first shaft 52) of the lower block 53 is inserted into the operation groove 63. As shown by a solid line in FIG. 14, in a condition that the second shaft 64 is located on the lower end side of the inclined operation groove 63, a free end side of the lower block 53 is downwardly inclined with the first shaft 52 as a center, as shown in FIG. 15. After the insertion of the tray, the first and second lower block rotation operating units 54, 55 are moved to a direction indicated by an arrow A, as shown by a two-dot chain line in FIG. 14. Then, the second shaft 64 is located on an upper end side of the inclined operation groove 63. Accordingly, the lower block 53 is substantially horizontally lifted up and maintained.

As shown in FIG. 16, the upper block 51 has on left and right sides thereof, a pair of tray supporters (hereafter, the tray supporters of this elevator 5 are referred to as third and fourth tray supporters) 65, 66. The third and fourth tray supporters 65, 66 support the first and second supported members 17, 18 on both the sides of the tray 11 pulled out of the disc cartridge 4.

The third tray supporter 65 has a guide protrusion (hereafter, this guide protrusion of the elevator 5 is referred to as a second guide protrusion) 67, which is inserted into the long grooved concave portion 19 of the tray 11 pulled out of the disc cartridge 4 to then guide the operation for pulling the tray 11 in.

When the tray 11 is pulled into the elevator 5 up to a maximum, the second guide protrusion 67 is engaged with the second hole 21 made in center of the long grooved concave portion 19 of the tray 11, as shown in FIG. 12. Accordingly, it is allowable to lower the tray 11 by approximately 1 mm.

As shown in FIG. 17A, the upper block 51 includes the loading mechanism 7 and the disc chucking mechanism 8. Also, as shown in FIG. 17B, the lower block 53 includes a disc recording and/or reproducing unit provided with: a disc table 68; a disc rotation driving mechanism and optical pickup 69 composed of a spindle motor 70 for rotationally driving this disc table 68; and an optical block composed of a carriage 71 having the optical pickup 69 and the like. By the way, the carriage 71 moves the optical pickup 69 along a guide shaft 72. Moreover, a carriage driving mechanism 73 drives the carriage 71. The carriage driving mechanism 73 has a motor 74, a gear train 75 and a lead screw 76. Since the motor 74 rotates the lead screw 76 through the gear train 75, the carriage 71 is moved along the guide shaft 72. Accordingly, the optical pickup 69 mounted on the carriage 71 is moved to a radius direction of a disc D chucked on the disc table 68.

Figure 18:
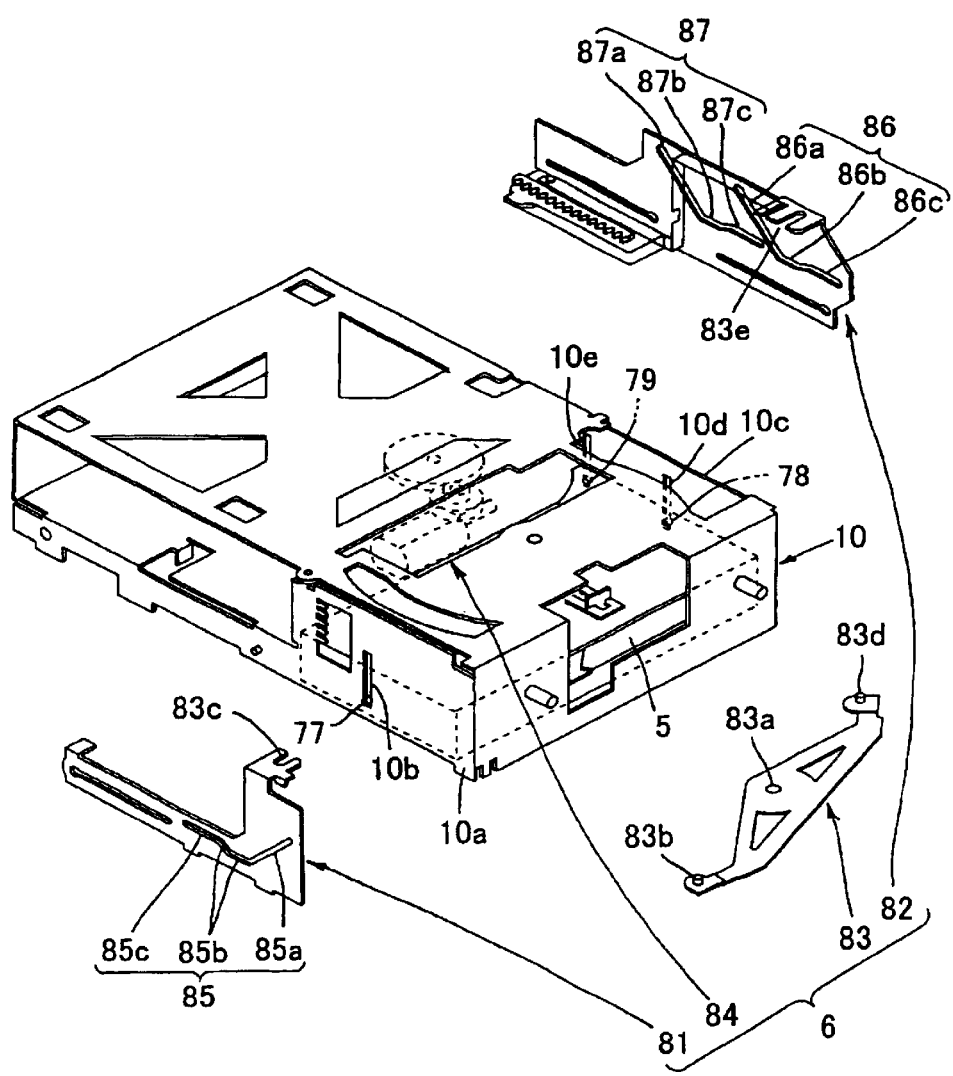
FIG. 18 is an exploded perspective view of an elevating control mechanism.

As shown in FIG. 18, the elevator 5 has a first supported shaft 77 on one side thereof, and has second and third supported shafts 78, 79 on the other side. The elevator 5 is installed to a mechanical chassis 10 in such a way that it can be vertically raised and lowered, by inserting the first supported shaft 77 into a first elevating guide groove 10b formed on a first side surface 10a of the mechanical chassis 10 and inserting the second and third supported shafts 78, 79 into second and third elevating guide grooves 10d, 10e formed on a second side surface 10c of the mechanical chassis 10.

The elevator 5 is raised and lowered to the position of the desired tray 11 of the disc cartridge 4 by the elevating control mechanism 6 described below. Accordingly, the tray 11 is pulled out, and the disc D is chucked onto the disc table 68. Then, the disc recording and/or reproducing operation is carried out by the recording and/or reproducing unit composed of the optical pickup 69 and the like.

(4) Explanation of Elevating Control Mechanism

The elevating control mechanism raises and lowers the elevator 5 to the position of the desired tray in the disc cartridge 4.

Figure 19:
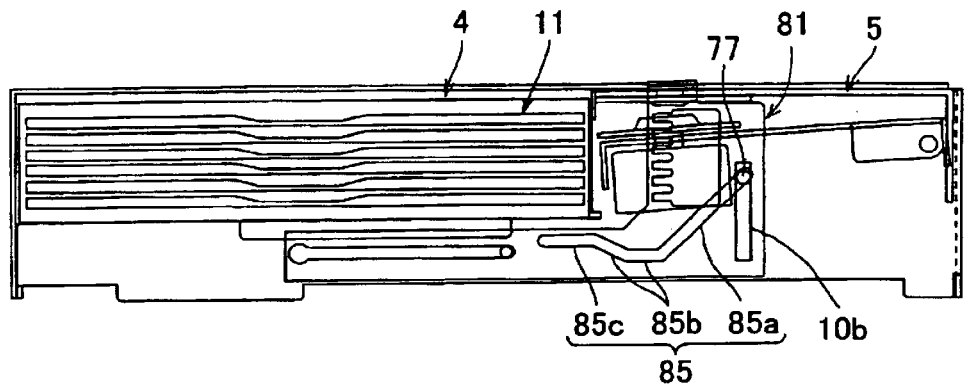
FIG. 19 is a side view of the disc auto-changer in a condition that the elevator is raised to a position corresponding to a tray on a top stage.
Figure 20:
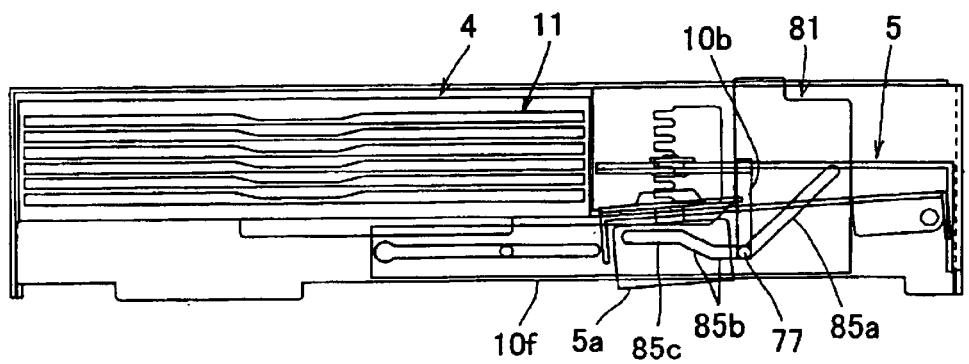
FIG. 20 is a side view of the disc auto-changer in a condition that the elevator is lowered to a position corresponding to a tray on a bottom stage.
Figure 21:
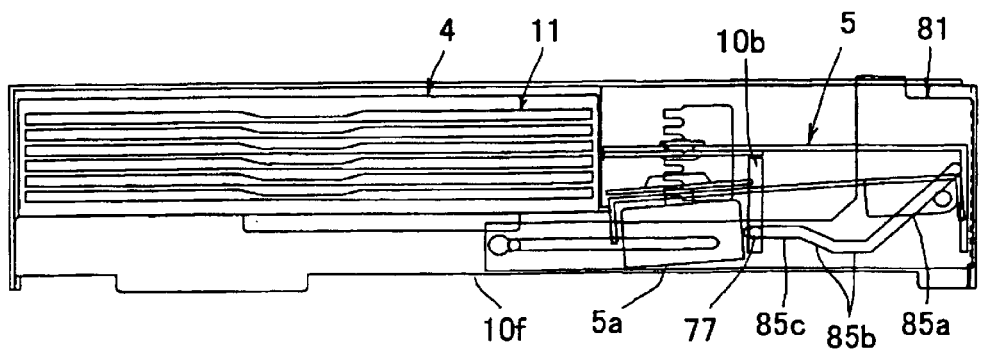
FIG. 21 is a side view of the disc auto-changer in a condition that the elevator is located at a waiting position.

FIG. 18 is an exploded perspective view of the elevating control mechanism 6. FIG. 19 is a side view of the elevating control mechanism 6 in a condition that the elevator 5 is moved to a position corresponding to a tray on a top stage of the disc cartridge 4. FIG. 20 is a side view of the elevating control mechanism 6 in a condition that the elevator 5 is moved to a position corresponding to a tray on a bottom stage of the disc cartridge 4. FIG. 21 is a side view of the elevating control mechanism 6 in a condition that the elevator 5 is standing at a waiting position.

As shown in FIG. 18, the elevating control mechanism 6 includes: a first elevating operation plate 81 to be slidably superimposed on an external surface of the first side surface 10a of the mechanical chassis 10; a second elevating operation plate 82 to be slidably superimposed on an external surface of the second side surface 10c of the mechanical chassis 10; a link lever 83 for connecting the first and second elevating operation plates 81, 82 to each other; and an operation plate driving mechanism 84 for sliding the second elevating operation plate 82.

The first elevating operation plate 81 has a first operation groove 85 for supporting the first supported shaft 77 of the elevator 5 at an intersection with the first elevating guide groove 10b formed on the first side 10a of the mechanical chassis 10.

The first operation groove 85 has an inclined groove 85a for elevating an elevating operation, and a horizontal waiting groove 85c connected through a linkage groove 85b to a lower end of the inclined groove 85a for the elevating operation.

As shown in FIG. 19, the first elevating operation plate 81 supports the elevator 5 at the position corresponding to the tray 11 on the top stage of the disc cartridge 4, in a condition that the first supported shaft 77 is located at an upper end of the inclined groove 85a for the elevating operation.

As shown in FIG. 20, the first elevating operation plate 81 supports the elevator 5 at the position corresponding to the tray 11 on the bottom stage of the disc cartridge 4, in a condition that the first supported shaft 77 is located at a lower end of the inclined groove 85a for the elevating operation. In this case, a lower end 5a of the elevator 5 is in a condition that it protrudes from a lower end 10f of the mechanical chassis 10.

As shown in FIG. 21, in a condition that the first supported shaft 77 is located at the horizontal waiting groove 85c, the first elevating operation plate 81 together with the second elevating operation plate 82 described below is designed so as to raise the elevator 5 from the position corresponding to the tray 11 on the bottom stage to a position at which the lower end 5a of the elevator 5 does not protrude from the lower end 10f of the mechanical chassis 10 (a position where the lower end 5a of the elevator 5 is accommodated in the mechanical chassis 10) and to keep it at the waiting state.

Also, as shown in FIG. 18, the second elevating operation plate 82 has a second operation groove 86 for supporting the second supported shaft 78 of the elevator 5 at an intersection with the second elevating guide groove 10d formed on the second side surface 10c of the mechanical chassis 10, and a third operation groove 87 for supporting the third supported shaft 79 of the elevator 5 at an intersection with the third elevating guide groove 10e.

The second operation groove 86 has an inclined groove 86a for the elevating operation, and a horizontal waiting groove 86c connected through a linkage groove portion 86b to a lower end of the groove 86a for the elevating operation, similarly to the first operation groove 85.

The third operation groove 87 also has an inclined groove 87a for the elevating operation, and a horizontal waiting groove 87c connected through a linkage groove 87b to a lower end of the groove 87a for the elevating operation, similarly to the second operation groove 86.

In a condition that the second and third supported shafts 78, 79 of the elevator 5 are located at upper ends of the inclined grooves 86a, 87a for the elevating operation of the second and third operation grooves 86, 87, the second elevating operation plate 82 together with the first elevating operation plate 81 is designed so as to support the elevator 5 at the position corresponding to the tray 11 on the top stage of the disc cartridge 4. In a condition that the second and third supported shafts 78, 79 of the elevator 5 are located at lower ends of the grooves 86a, 87a for the elevating operation, it is designed so as to support the elevator 5 at the position corresponding to the tray 11 on the bottom stage of the disc cartridge 4. And, in a condition that the second and third supported shafts 78, 79 of the elevator 5 are located at the horizontal waiting grooves 86c, 87c, it is designed so as to raise the elevator 5 from the position corresponding to the tray 11 on the bottom stage to a position at which the lower end 5a of the elevator 5 does not protrude from the lower end 10f of the mechanical chassis 10 (a position where the lower end 5a of the elevator 5 is accommodated in the mechanical chassis) and to keep it at the waiting state.

The second and third operation grooves 86, 87 are formed oppositely to the first operation groove 85. Accordingly, the first elevating operation plate 81 and the second elevating operation plate 82 are slid to the directions opposite to each other to then raise and lower the elevator 5.

With regard to the link lever 83, a center portion thereof is rotatably attached to the mechanical chassis 10 through a shaft 83a. One end thereof is linked to the first elevating operation plate 81 through a first pin 83b and a first long hole 83c. The other end is linked to the second elevating operation plate 82 through a second pin 83d and a second long hole 83e.

The link lever 83 is rotated with the shaft 83a as a center if the first elevating operation plate 81 is slid in one direction by the operation plate driving mechanism 84. Accordingly, the second elevating operation plate 82 is slid in an opposite direction in synchronization with the first elevating operation plate 81.

The elevating control mechanism 6 of the embodiment has the above-mentioned configuration. As shown in FIG. 19, in a condition that the first elevating operation plate 81 is moved to the leftmost position, the second elevating operation plate 82 becomes in a condition that it is moved to the rightmost position on the side of the second side surface 10c of the mechanical chassis 10. Then, the elevating control mechanism 6 supports the first supported shaft 77 of the elevator 5 at an upper end of the inclined groove 85a for the elevating operation of the first operation groove 85 of the first elevating operation plate 81, and also supports the second and third supported shafts 78, 79 of the second elevating operation plate 82, and further supports the elevator 5 at the position corresponding to the tray 11 on the top stage of the disc cartridge 4.

When the first elevating operation plate 81 is moved from the state shown in FIG. 19 to the right by a predetermined amount, the second elevating operation plate 82 is moved to the left in synchronization with that movement of the first elevating operation plate 81. Accordingly, for each movement of the predetermined amount, the elevator 5 is moved to a position corresponding to each of the trays on the second stage, the third stage . . . from the top of the disc cartridge 4.

Then, as shown in FIG. 20, when the first supported shaft 77 of the elevator 5 is supported at the lower end of the inclined groove 85a for the elevating operation of the first operation groove 85 of the first elevating operation plate 81, the second and third supported shafts 78, 79 of the elevator 5 are supported at the lower ends of the inclined grooves 86a, 87a for the elevating operation of the second and third operation grooves 86, 87 of the second elevating operation plate 82. Accordingly, the elevator 5 is supported at the position corresponding to the tray on the bottom stage.

When the first elevating operation plate 81 is further moved from the condition shown in FIG. 20 to the right by the predetermined amount, the second elevating operation plate 82 is also moved to the left in synchronization with that movement of the first elevating operation plate 81. The first, second and third supported shafts 77, 78, and 79 are inserted into the waiting grooves 85c, 86c and 87c of the first, second and third operation grooves 85, 86, and 87. Accordingly, the lower end 5a of the elevator 5 is supported at a waiting position which is at least located upper than the lower end 10f of the mechanical chassis 10.

(5) Explanation of Loading Mechanism

The loading mechanism 7 is the mechanism for feeding the tray (disc) from the disc cartridge 4 to the elevator 5, and feeding, namely, returning the tray from the elevator 5 to the disc cartridge 4.

Figure 22:
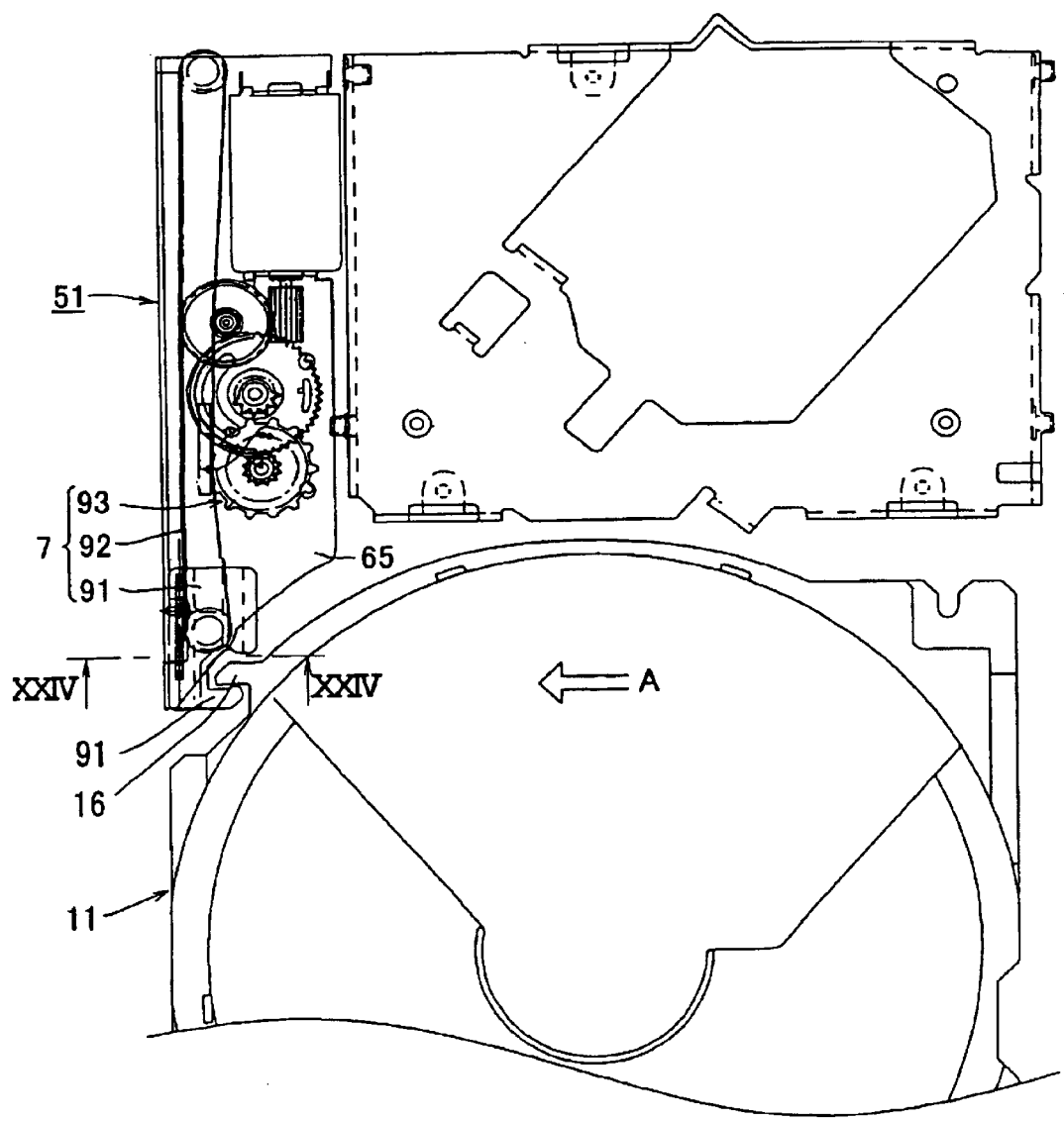
FIG. 22 is a plan view of a loading mechanism.
Figure 23:
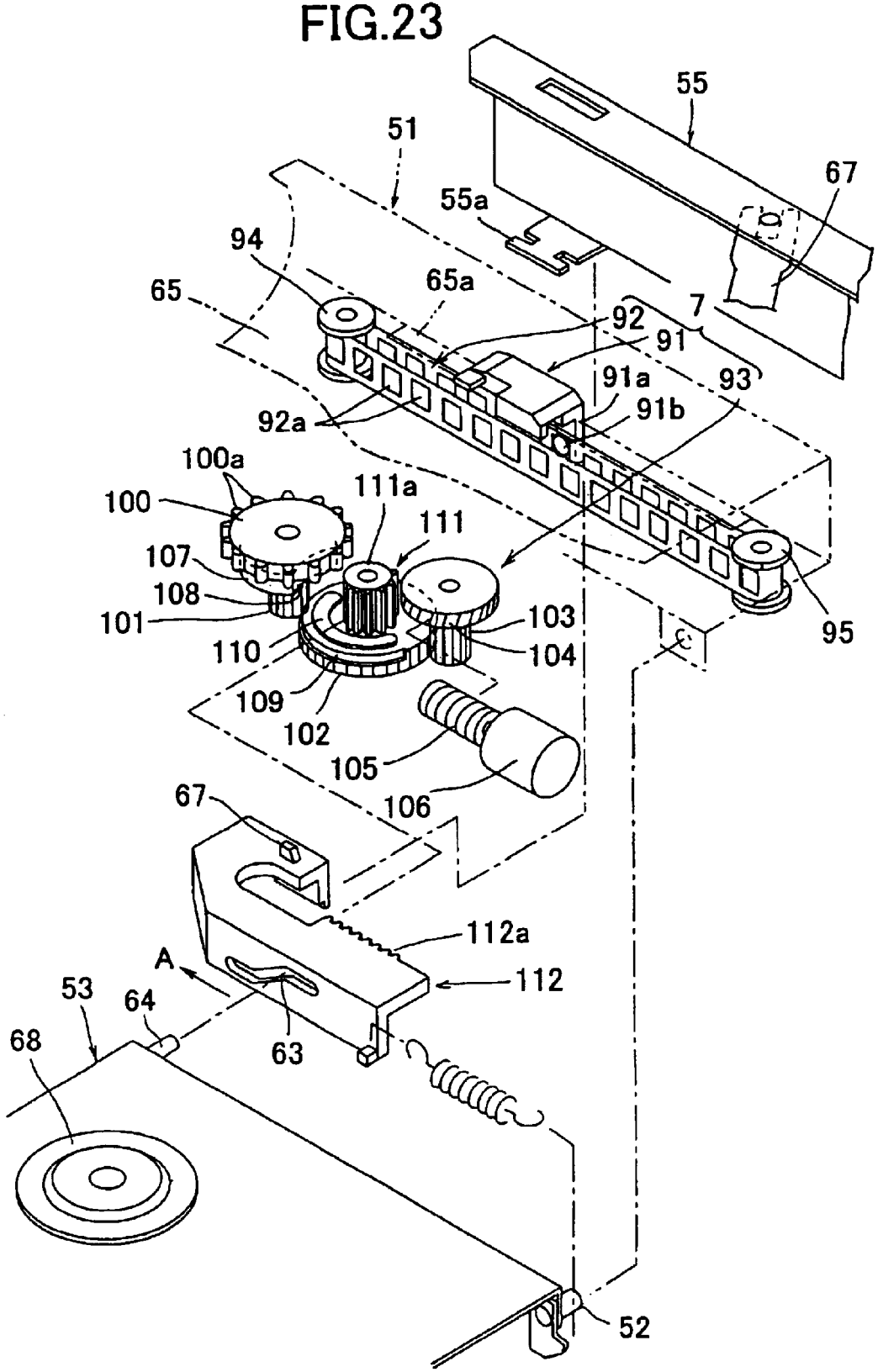
FIG. 23 is an exploded perspective view of the loading mechanism.
Figure 24:
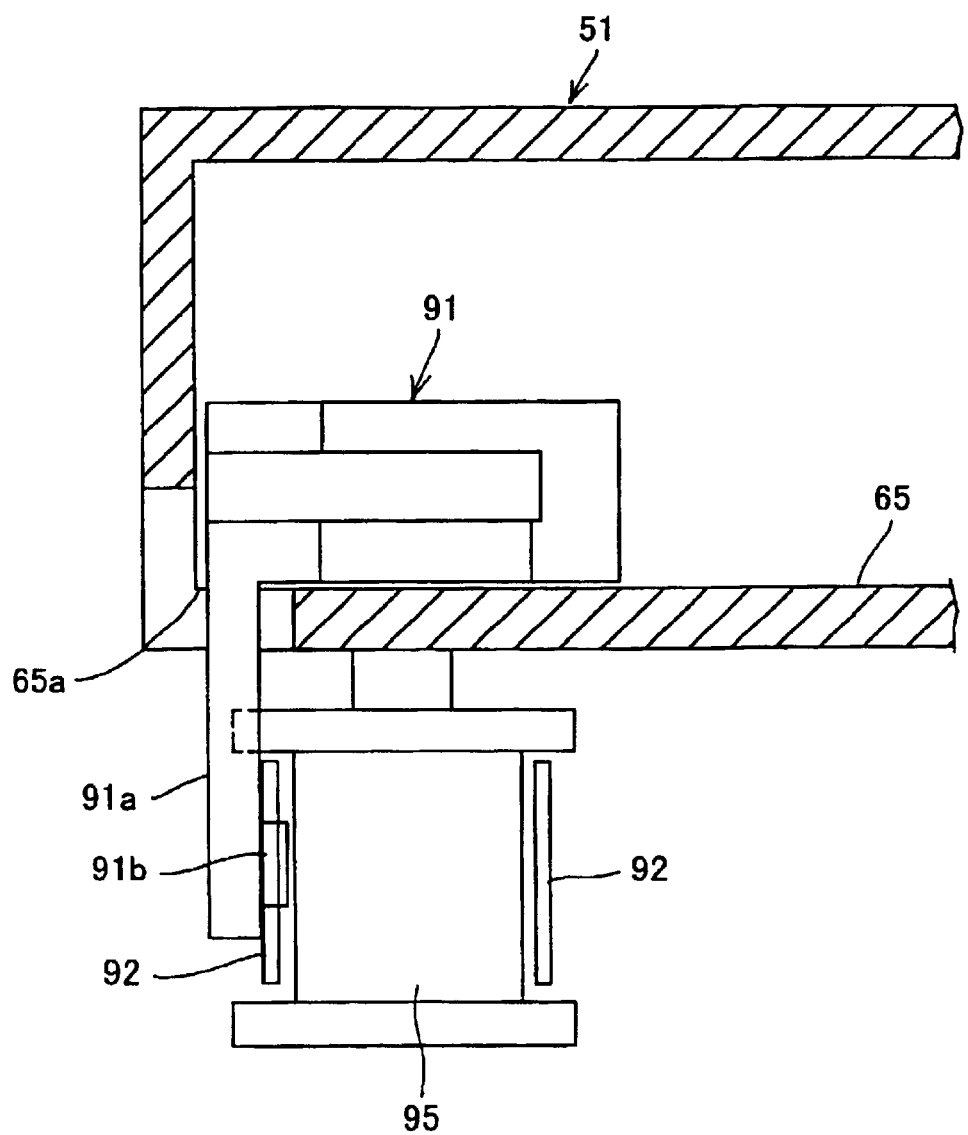
FIG. 24 is a sectional view of the loading mechanism taken on a line XXIV—XXIV of FIG. 22.
Figure 25:
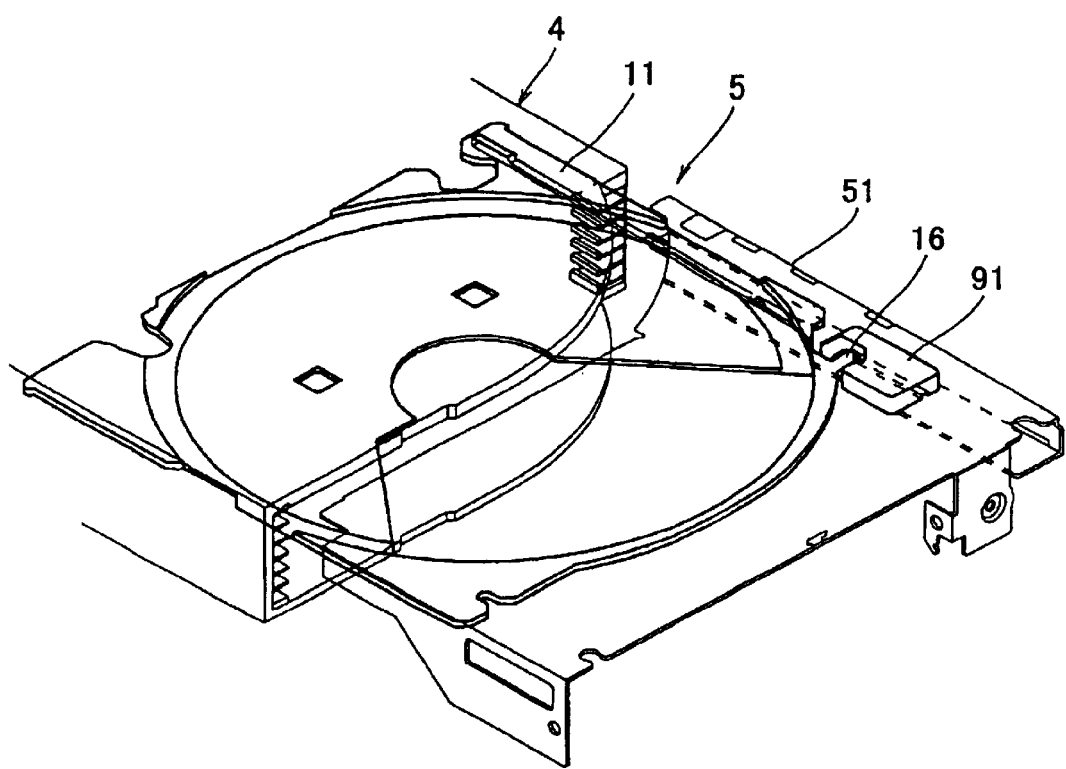
FIG. 25 is a perspective view of the loading mechanism in a condition that the tray is pulled into a side of the elevator.

FIG. 22 is a plan view of the loading mechanism 7. FIG. 23 is an exploded perspective view of the loading mechanism 7. FIG. 24 is a sectional view taken on a line XXIV—XXIV of FIG. 22. FIG. 25 is a perspective view showing a condition that the tray is pulled in the elevator 5.

As shown in FIG. 22, the loading mechanism 7 has the hook fitting unit 91 to be fit in the hook 16 of the tray 11; a belt 92 for moving the hook fitting unit 91 to a direction in which the tray is taken in and out; and a belt driving mechanism 93 for driving the belt 92. The hook fitting unit 91 is arranged on a top side of the third tray supporter 65 of the upper block 51 of the elevator 5. The belt 92 and the belt driving mechanism 93 are arranged on a bottom side of the third tray supporter 65.

As shown in FIG. 23, the hook fitting unit 91 has a coupling unit 91a to be coupled to the belt 92. The coupling unit 91a protrudes to a bottom side of the third tray supporter 65 through a guide hole 65a made in the third tray supporter 65, and it is installed on the belt 92 via a pin 91b.

The belt 92 is configured to have no end, namely, it is endless. (Hereafter, the belt 92 is referred to as an endless belt). The endless belt 92 is hung on a first pulley 94 and a second pulley 95. When the endless belt 92 rotates, the hook fitting unit 91 moves to the direction, in which the tray is taken in and out, along the guide hole 65a. A number of notch holes 92a are made on the endless belt 92 at a predetermined interval in that rotational direction.

The belt driving mechanism 93 is provided with: a sprocket 100 for driving the endless belt 92; a first gear 101 on the same shaft as the sprocket 100; a second gear 102 engaged with the first gear 101; a third gear 103 engaged with the second gear 102; a fourth gear 104 on the same shaft as the third gear 103, a fifth gear 105 engaged with the fourth gear 104; and a loading motor 106 for rotating the fifth gear 105.

Protrusions 100a to be fit in the notch holes 92a of the endless belt 92 are formed on a circumference plane of the sprocket 100.

The first gear 101 is disposed on a bottom surface of the sprocket 100 having a spacer 107 therebetween. A notch 108 in a form of circular arc is formed in the spacer 107.

A non-tooth portion 109 is disposed on an upper half of the second gear 102. Also, a rib 110 in a form of circular arc, which is opposite to the notch 108 of the spacer 107, is disposed in a portion corresponding to the non-tooth portion 109 on the top surface of the second gear 102. The first gear 101 is engaged with the upper half of the second gear 102 having the non-tooth portion 109. The third gear 103 is designed to be engaged with both the upper half and the lower half of the second gear 102. A screw gear (helical gear) is used in the fourth gear 104, and a worm gear is used in the fifth gear 105.

As shown in FIG. 22, in a condition that the hook fitting unit 91 is advanced to the closest position to a tray outlet/inlet side of the elevator 5, if the disc cartridge 4 is inserted into the cartridge accommodating unit 3 of the mechanical chassis 10 from a direction indicated by an arrow A, the hook 16 of the tray 11 is naturally fit in the hook fitting unit 91.

If the motor 106 is rotated to one direction in this condition, the sprocket 100 is counterclockwise rotated through the fifth gear 105 to the first gear 101, and the endless belt 92 is clockwise rotated. Accordingly, the tray 11 is pulled into the elevator 5 as shown in FIG. 25. Then, if the tray 11 is pulled into a predetermined position, the engagement between the second gear 102 and the first gear 101 is released to thereby stop the rotations of the sprocket 100 and the endless belt 92.

As shown in FIG. 23, a sixth gear 111 for rotating the lower block 53 of the elevator 5 in linkage with the loading mechanism 7 is installed on the top surface of the second gear 102.

The sixth gear 111 has a non-tooth portion 111a. The sixth gear 111 is engaged with a rack 112a of a rack member 112 which is installed to the lower end of the second lower block rotation operating unit 55 of the elevator 5. The rack member 112 has an inclined operation groove 63 on one side. The second shaft 64 on one side of the lower block 53 of the elevator 5 is inserted into the operation groove 63. The rack member 112 is installed to an installation portion 55a of the lower end of the second lower block rotation operating unit 55 of the elevator 5.

Figure 27:
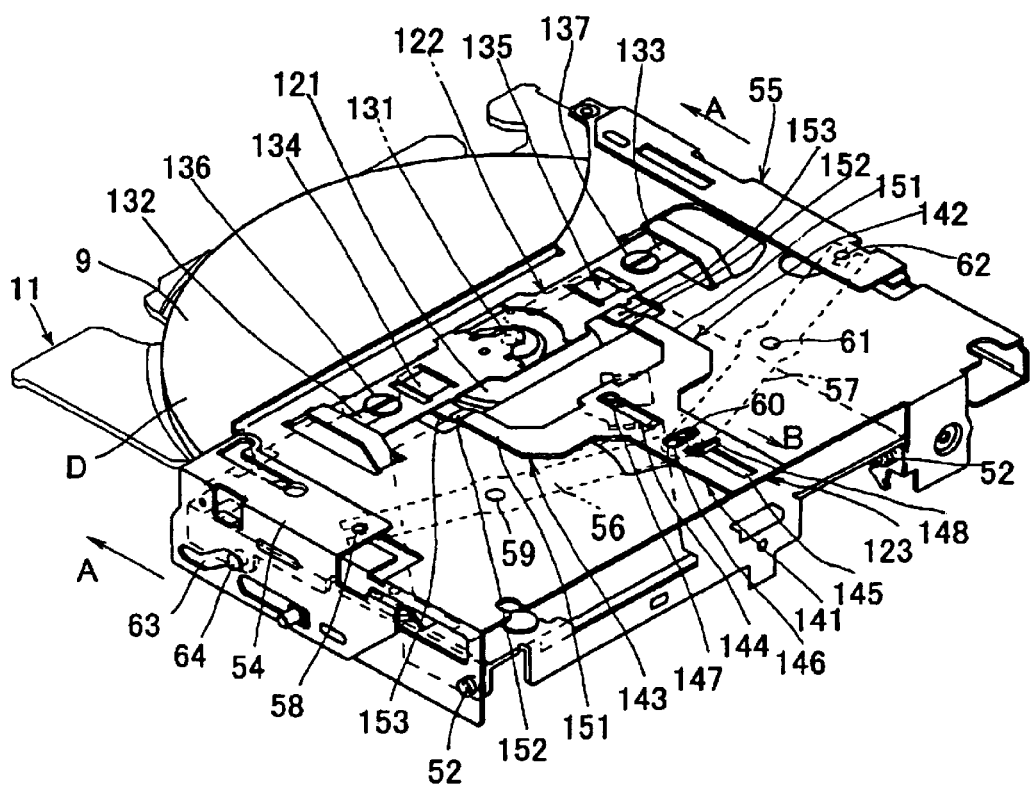
FIG. 27 is a perspective view of the disc chucking mechanism.

As mentioned above, when the tray 11 is pulled in up to the predetermined position to thereby release the engagement between the second gear 102 and the first gear 101, the sixth gear 111 and the rack member 112 are engaged with each other. Then, the rack member 112 and the second lower block rotation operating unit 55 are moved to the left (a direction indicated by an arrow A) of FIG. 23 to thereby push up the second shaft 64 to the upper end side of the inclined operation groove 63. On the other hand, the movement of the second lower block rotation operating unit 55 causes the first lower block rotation operating unit 54 to be also moved to the same direction through the first and second link levers 56, 57. Accordingly, as shown in FIG. 27, the second shaft 64 on the other side of the lower block 53 is pushed up to the upper end side of the inclined operation groove 63, similarly to the second lower block rotation operating unit 55. Then, the lower block 53 is upwardly rotated to thereby place on the disc table 68 the disc D supported on the tray 11.

Also, as mentioned above, if the loading motor 106 is reversibly rotated from a condition that the lower block 53 is upwardly rotated, the rack member 112 and the second lower block rotation operating unit 55 are moved oppositely to the direction when the tray is pulled in. In linkage with this movement, the first lower block rotation operating unit 54 is also moved to the same direction, and the lower block 53 is downwardly rotated, which results in a condition that the disc table 68 is separated from the tray 11. Next, the second gear 102 and the first gear 101 are engaged with each other, and the sprocket 100 and the endless belt 92 are rotated oppositely to the direction at the time when the tray is pulled in. Accordingly, the tray 11 is pushed back into the disc cartridge 4 by the hook fitting unit 91.

(6) Explanation of Disc Chucking Mechanism

The disc chucking mechanism 8 is the mechanism for pushing the disc against the disc table 68, and protecting the disc from slipping on the disc table 68, and integrally rotating the disc table 68 and the disc, and surely carrying out the disc recording and/or reproducing operation.

Figure 26:
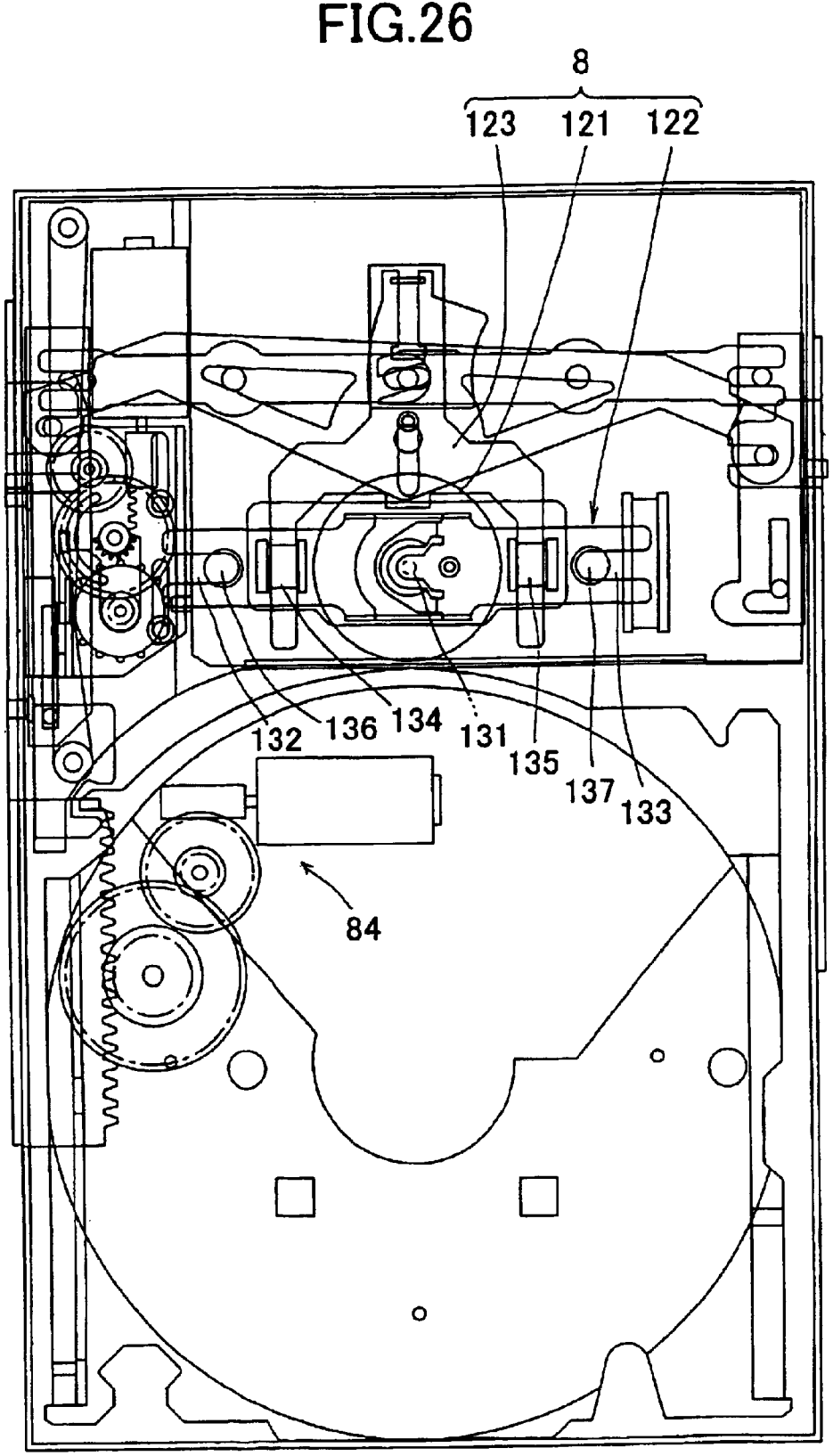
FIG. 26 is a plan view of a disc chucking mechanism.
Figure 28:
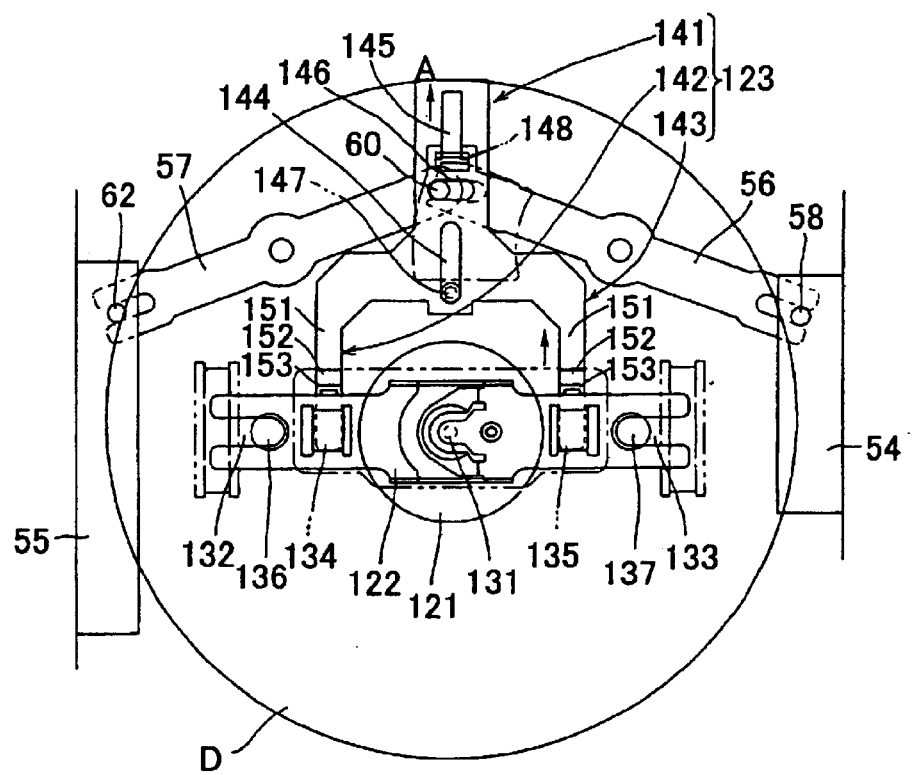
FIG. 28 is a plan view showing a state of chucking a disc.
Figure 29:
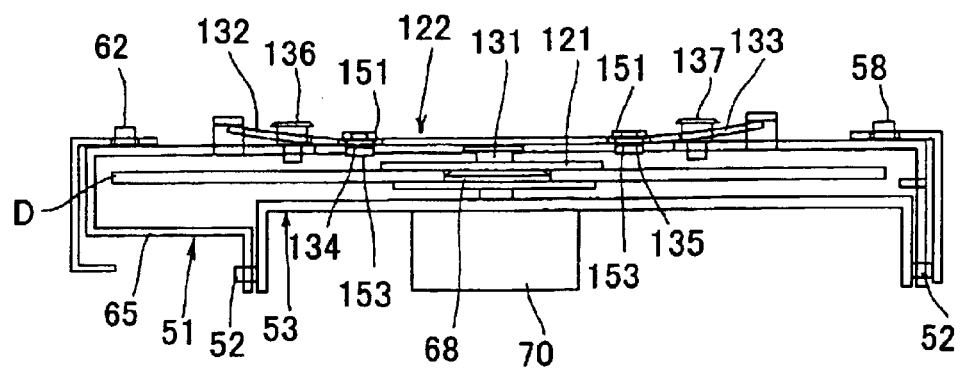
FIG. 29 is a front view showing the state of chucking the disc.
Figure 30:
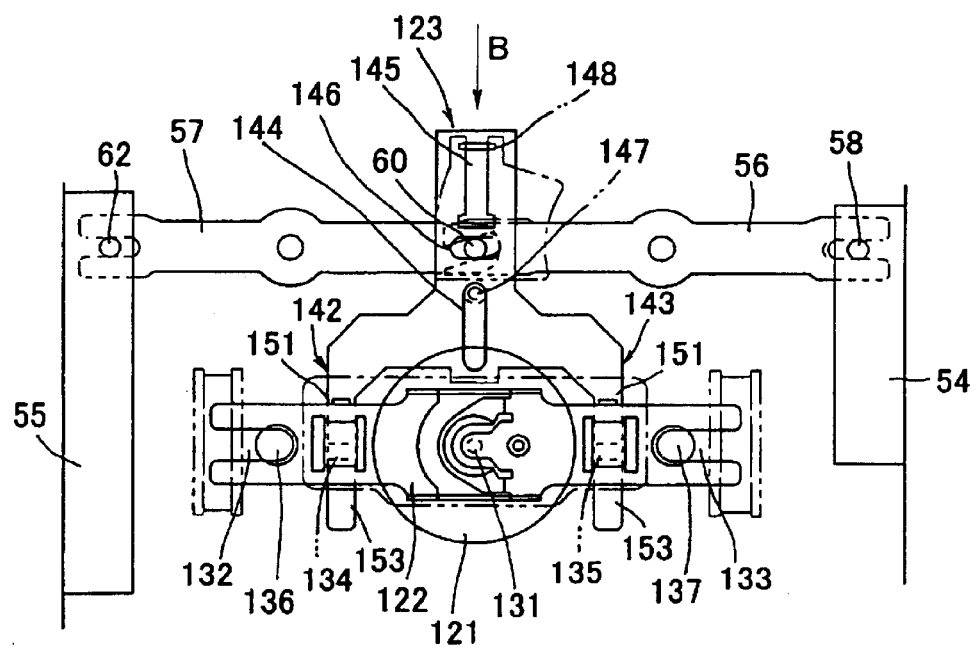
FIG. 30 is a plan view showing a state where chucking of a disc is released.
Figure 31:
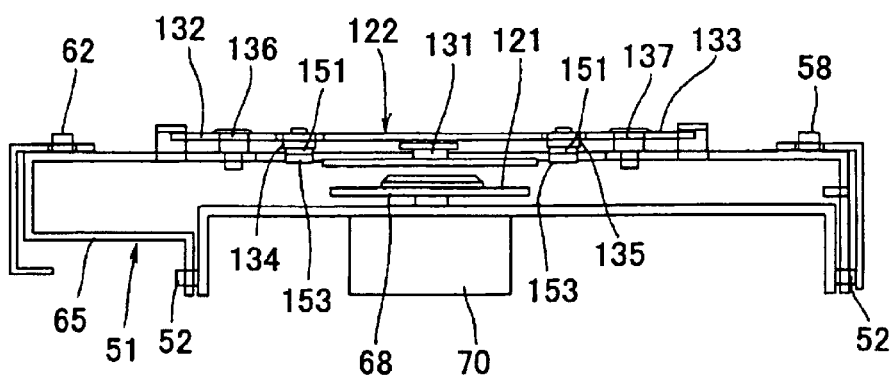
FIG. 31 is a front view of the chucking release state.
Figure 32:
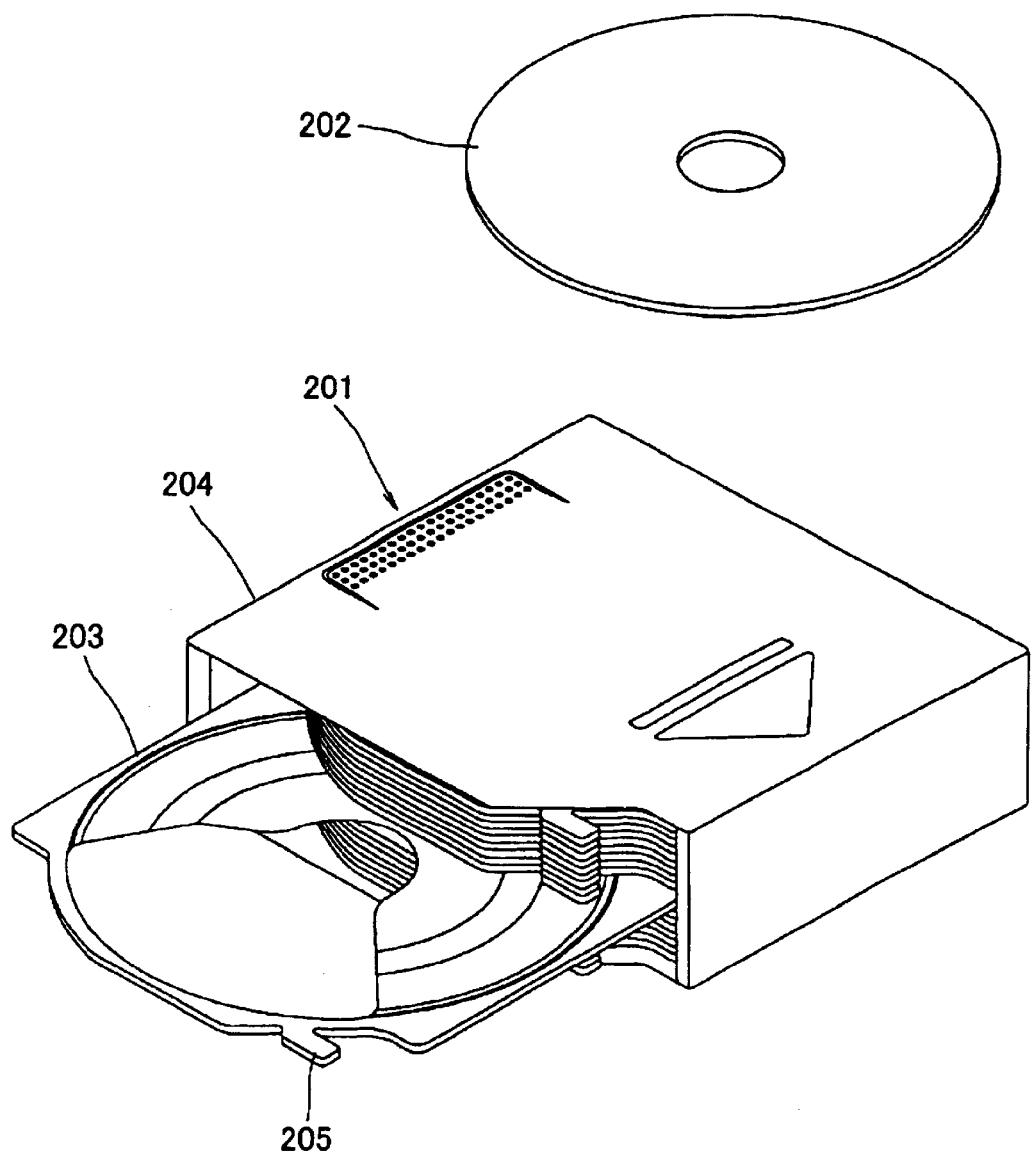
FIG. 32 is a perspective view of a conventional disc cartridge.
Figure 33:
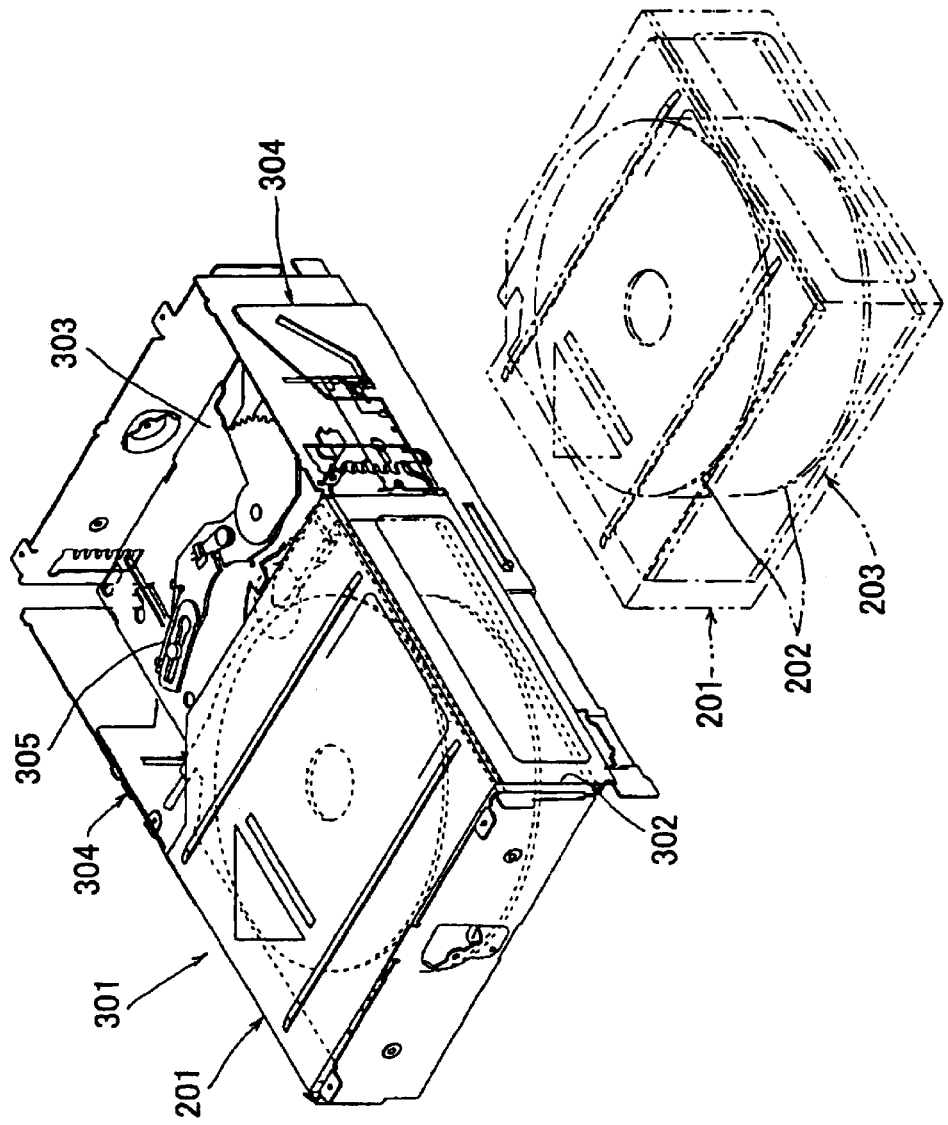
FIG. 33 is a perspective view of a conventional disc auto-changer.
Figure 34A:
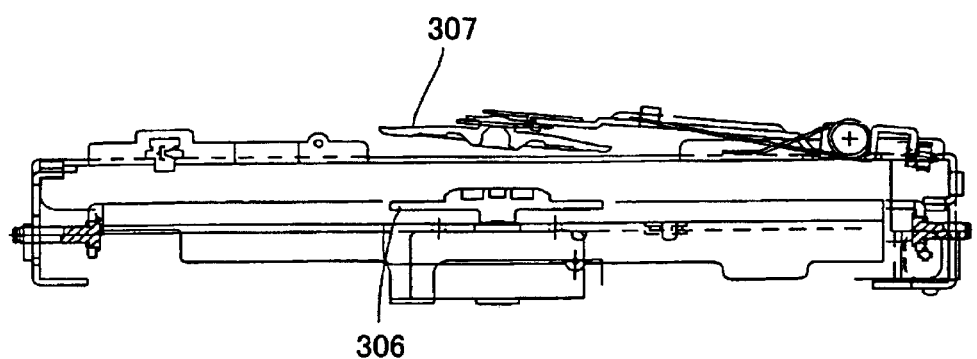
FIG. 34A is a front view of a disc chucking mechanism showing a state of chucking release.
Figure 34B:
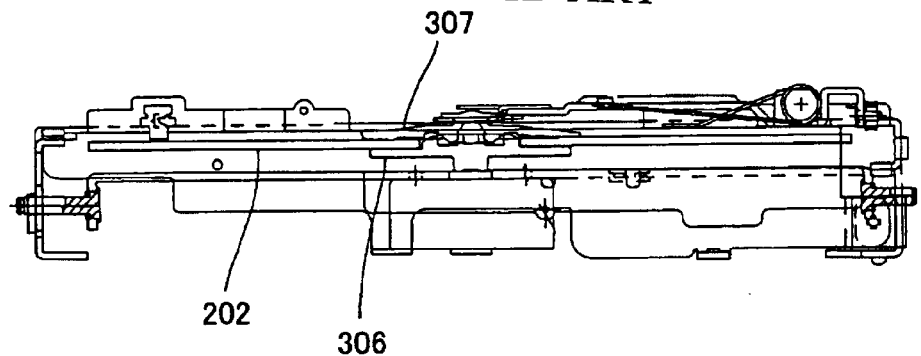
FIG. 34B is a front view of the disc chucking mechanism showing a state of chucking a disc.
Figure 35:
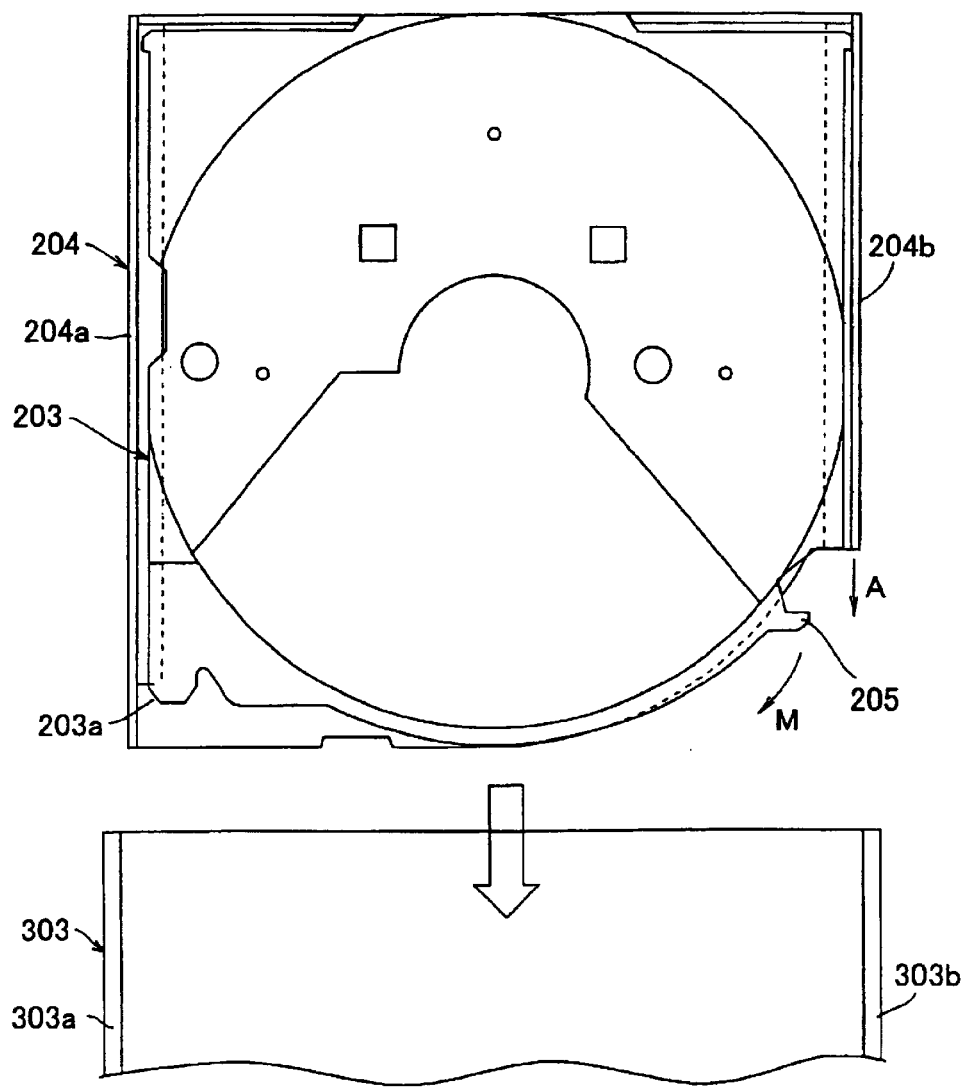
FIG. 35 is an explanation view showing a problem of the conventional disc cartridge.

FIG. 26 is a plan view showing a condition when the disc chucking mechanism 8 is assembled on the top surface of the elevator 5. FIG. 27 is a perspective view of the disc chucking mechanism 8. FIG. 28 is a plan view showing the chucking state. FIG. 29 is a front view of the chucking state. FIG. 30 is a plan view showing a chucking release state. FIG. 31 is a front view of the chucking release state.

The disc chucking mechanism 8 is provided with: a chucking plate 121 for pressing the disc; a chucking plate supporter 122 for supporting the chucking plate 121; and an operating unit 123 for pushing the chucking plate 121 against the disc through the chucking plate supporter 132.

The chucking plate 121 is configured in a form of a circle having a diameter substantially equal to that of the disc table 68. A center portion thereof is supported by the chucking plate supporter 122 in a condition that a somewhat vertical motion is allowable by a shaft 131.

The chucking plate supporter 122 is made of a leaf spring material, and it is slenderly rectangular. First and second long holes 132, 133 are made in one end and the other end of a longitudinal direction, respectively. First and second protrusions 134, 135 protruding toward a bottom side are formed on inner sides of the first and second long holes 132, 133.

The chucking plate supporter 122 is installed on the top surface of the upper block 51 of the elevator 5 through first and second shafts 136, 137 inserted into the first and second long holes 132, 133, so that it can be moved in the longitudinal directions of the first and second long holes 132, 133.

As shown in FIG. 29, the chucking plate supporter 122 is downwardly curved, and a spring force in a direction in which the chucking plate 121 is pushed against the disc table 68 is given to it.

As shown in FIG. 28, the operating unit 123 is provided with: a base 141; and first and second arms 142, 143 branched into two parts from a tip of the base 141.

The base 141 is provided with: first and second long slide guide holes 144, 145; and a long connecting pin reception hole 146 made between the first and second slide guide holes 144, 145.

The base 141 is installed on a top surface of the upper block 51 of the elevator 5 through the first and second slide guide members 147, 148 by using the first and second slide guide holes 144, 145 so that it can be slid within a range of lengths of the first and second slide guide holes 144, 145. Also, the connecting pin 60 between the first link lever 56 and the second link lever 57 which are placed on the top surface of the upper block 51 is loosely engaged with the connecting pin reception hole 146.

The first and second arms 142, 143 are provided with: chucking plate supporter pushers 151 for abutting to the bottom surfaces of the first and second protrusions 134, 135, and then pushing up the first and second protrusions 134, 135 and the chucking plate supporter 122 against its spring force, and further separating the chucking plate 121 from the disc D on the disc table 68; and chucking plate supporter lowering permitters 153 connected through falling gradient planes 152 to the pushers 151.

As shown in FIG. 28, when the operating unit 123 is slid to a direction indicated by an arrow A, the chucking plate supporter lowering permitters 153 of the first and second arms 142, 143 are located on the bottom surfaces of the first and second protrusions 134, 135 of the chucking plate supporter 122. As shown in FIG. 29, the chucking plate supporter 122 is downwardly deformed by a spring force itself to thereby lower the chucking plate 121 toward the side of the disc table 68. Accordingly, the disc D is sandwiched between the chucking plate 121 and the disc table 68, which results in the chucking state. (At this time, the lower block 53 of the elevator 5 is upwardly rotated in linkage with the operation of the operating unit 123, which leads to a raised state of the disc table 68.)

Also, as shown in FIGS. 30, 31, when the operating unit 123 is slid to a direction indicated by an arrow B, the chucking plate pushers 151 of the first and second arms 142, 143 are located on the bottom surfaces of the first and second protrusions 134, 135 of the chucking plate supporter 122. Accordingly, the chucking plate supporter 122 is pushed up against the spring force itself to thereby separate the chucking plate 121 from the disc of the disc table 68. (At this time, the lower block 53 of the elevator 5 is downwardly rotated in linkage with the operation of the operating unit 123, which leads to a lowered state of the disc table 68.)

The linkage operation between the operating unit 123 and the lower block 53 is carried out through the first and second link levers 56, 57 disposed on the bottom surface of the upper block 51 of the elevator 5.

As shown in FIG. 27, when the tray 11 is loaded to the predetermined position of the elevator 5 by the loading mechanism 7, the second lower block rotation operating unit 55 of the elevator 5 is moved to the direction indicated by the arrow A by the loading mechanism 7. (For further description, refer to the above item [(2) Explanation of Elevator]).

When the second lower block rotation operating unit 55 is slid to the direction indicated by the arrow A, the second link lever 57 whose one end is coupled through the fifth pin 62 to the second lower block rotation operating unit 55 is counterclockwise rotated with the fourth pin 61 as a center. The first link lever 56 is clockwise rotated through the connecting pin 60 with the second pin 59 as a center. Also, the first lower block rotation operating unit 54 connected through the first pin 58 to one end of the first link lever 56 is moved to the direction indicated by the arrow A. In short, the second lower block rotation operating unit 55 and the first lower block rotation operating unit 54 are slid to the direction indicated by the arrow A, in synchronization with each other. Thus, the second shaft 64 of the lower block 53 is located on the upper end side of the inclined operation groove 63 formed in the lower portions of the first and second lower block rotation operating units 54, 55, and the lower block 53 is clockwise rotated with the first shaft 52 as a center. Accordingly, the disc table 68 is raised.

As mentioned above, when the second link lever 57 is counterclockwise rotated with the fourth pin 61 as the center, the operating unit 123 is slid to the direction indicated by the arrow B, through the connecting pin 60 between the first and second link levers 56, 57 and the connecting pin reception hole 146. Thus, the chucking plate supporter lowering permitters 153 of the first and second arms 142, 143 are located at the lower portions of the first and second protrusions 134, 135 of the chucking plate supporter 122. Hence, the chucking plate supporter 122 is deformed by its spring force. This deformation causes the chucking plate 121 to push the disc D against the disc table 68. Accordingly, the operation for chucking the disc D is carried out.

Also, at a time of unloading the disc, the first and second lower block rotation operating units 54, 55 and the operating unit 123 are slid oppositely to the direction at the time of the loading. Thus, the chucking plate supporter 122 is pushed up to thereby raise the chucking plate 121 to the chucking release position and downwardly rotate the lower block 53. Accordingly, the disc table 68 is separated from the disc D and the tray 11.

(7) Explanation of Entire Disc Auto-Changer

When the respective discs D are placed on the trays 11 of the disc cartridge 4, and the disc cartridge 4 is loaded to the cartridge accommodating unit 3, the hooks 16 of the trays 11 and the hook fitting units 91 of the loading mechanism 7 disposed on the side of the elevator 5 become in a condition that they can be engaged to each other.

Next, the elevating control mechanism 6 raises the elevator 5 from the waiting position to a position corresponding to a tray 11 on which a desired disc is placed. Next, the loading mechanism 7 pulls the tray 11 on which the desired disc is placed, from the disc cartridge 4 into the elevator 5.

When the tray 11 is pulled in up to the predetermined position, the loading mechanism 7 upwardly rotates the lower block 53 of the elevator 5, and then raises the disc table 68 included in the lower block 53, and further places the disc D of the tray 11 on the disc table 68. In linkage with the rotational operation of the lower block 53, the disc chucking mechanism 8 is actuated to thereby lower the chucking plate 121, and chuck the disc D on the disc table

68, and also separate the tray 11 from the bottom surface of the disc D. Then, the disc recording and/or reproducing operation is carried out under that condition.

After the end of the recording and/or reproducing operation, if the loading mechanism 7 is again actuated, the loading mechanism 7 downwardly rotates the lower block 53 of the elevator 5. This downward rotation makes the elevator 5 be separated from the disc D and the tray 11. Also, in linkage with the rotation of the lower block 53, the disc chucking mechanism 8 is actuated to thereby raise the chucking plate 121 and accordingly release the chucking state of the disc.

Then, the continuous operation of the loading mechanism 7 causes the tray 11 to be returned from the elevator 5 to the disc cartridge 4. When the tray 11 is perfectly returned to the disc cartridge 4, the elevating control mechanism 6 is again actuated to then return the elevator 5 to the waiting position.

(8) Explanation of Another Embodiment of Slide Guide

In the embodiment described above, there is illustrate the case when the grooved concave portions serving as the slide guide are formed on the reverse surface of the tray, and the ligulate convex portions to be inserted into the grooved concave portions are formed on the cartridge case and the elevator side. However, on the contrary, the grooved concave portions are formed on the cartridge case and the elevator side, and the ligulate convex portions may be formed on the reverse side of the tray.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A disc cartridge comprising:
   a plurality of trays, each configured to hold a disc thereon; and
   a case configured to accommodate said plurality of trays such that said trays can be taken in and out through an opening, wherein:
   each of said trays has an operating unit;
   one of said case and said trays has a guide rail disposed in a direction in which said trays are taken in and out of said case and the operating unit of the respective tray is disposed at a position adjacent a line extending through the guide rail;
   an other one of said case and said trays has a fitting unit configured to be fit in a void formed in said guide rail to guide said tray along the guide rail, the fitting unit having first and second portions, the first portion disposed in the void and the second portion disposed outside the void; and
   the operating unit is disposed entirely outside of a projection of the guide rail and adjacent an interior of the respective tray.

2. The disc cartridge according to claim 1, wherein the fitting unit has an about L-shape.

3. The disc cartridge according to claim 1, wherein the first and second portions are disposed about perpendicular to one another.

4. The disc cartridge according to claim 1, wherein the second portion extends from the case about perpendicular to the case, and the first portion extends about perpendicular to the first portion.

5. The disc cartridge according to claim 4, wherein the void and the first portion have corresponding about rectangular cross sections.

6. The disc cartridge according to claim 5, wherein the second portion has an about rectangular cross section.

7. The disc cartridge according to claim 6, wherein the void is formed in a surface of the one of the trays opposite to a surface configured to hold the disc.

8. A disc cartridge comprising:
   first and second trays, each configured to hold a disc;
   a case configured to enable said trays to be taken in and out of the case;
   an operating unit disposed on said first tray and configured to be drawn or pressed to take said first tray in and out of said case;
   a slide guide disposed on one of the case and the first tray; and
   a fitting unit disposed on an other one of the case and the first tray, the fitting unit configured to fit in a void formed in the slide guide to guide the first tray along the slide guide, the fitting unit having first and second portions, the first portion disposed in the void and the second portion disposed outside the void, wherein:
   the slide guide is disposed at a position in a direction in which said first tray is taken in and out; and
   the operating unit is disposed at a position adjacent a line extending through the slide guide, and the operating unit is disposed entirely outside of a projection of the slide guide and adjacent an interior of the first tray.

9. The disc cartridge according to claim 8, wherein the fitting unit has an about L-shape.

10. The disc cartridge according to claim 8, wherein the first and second portions are disposed about perpendicular to one another.

11. The disc cartridge according to claim 8, wherein the second portion extends from the case about perpendicular to the case, and the first portion extends about perpendicular to the first portion.

12. The disc cartridge according to claim 11, wherein the void and the first portion have corresponding about rectangular cross sections.

13. The disc cartridge according to claim 12, wherein the second portion has an about rectangular cross section.

14. The disc cartridge according to claim 13, wherein the void is formed in a surface of the first tray opposite to a surface configured to hold the disc.

15. A disc recording and/or reproducing apparatus comprising:
   a recording and/or reproducing unit configured to record to and/or reproduce from a disc; and
   a disc cartridge comprising:
   first and second trays, each configured to hold the disc;
   a case configured to enable said trays to be taken in and out of the case;
   a slide guide disposed on one of the case and the first tray; and
   a fitting unit disposed on an other one of the case and the first tray, the fitting unit configured to be disposed in a void formed in the slide guide to guide the first tray along the slide guide, the fitting unit having first and second portions, the first portion disposed in the void and the second portion disposed outside the void, wherein:
   an operating unit disposed on said first tray at a position adjacent a line extending through the slide guide is drawn or pressed to accordingly take said first tray in and out, and
   the operating unit is disposed entirely outside of a projection of the slide guide and adjacent an interior of the first tray.

16. The disc cartridge according to claim 15, wherein the fitting unit has an about L-shape.

17. The disc cartridge according to claim 15, wherein the first and second portions are disposed about perpendicular to one another.

18. The disc cartridge according to claim 15, wherein the second portion extends from the case about perpendicular to the case, and the first portion extends about perpendicular to the first portion.

19. The disc cartridge according to claim 18, wherein the void and the first portion have corresponding about rectangular cross sections.

20. The disc cartridge according to claim 19, wherein the second portion has an about rectangular cross section.

21. The disc cartridge according to claim 20, wherein the void is formed in a surface of the first tray opposite to a surface configured to hold the disc.

22. A disc cartridge comprising:
at least one tray configured to hold a disc;
a case defining an opening and configured to receive the tray through the opening;
an operating unit disposed on the tray and configured to permit removal of the tray from the case;
a guide rail disposed on one of the tray and the case; and
a fitting unit disposed on the other of the case and the tray and configured to be disposed in a void formed in the guide rail, the fitting unit having first and second portions, the first portion disposed in the void and the second portion disposed outside the void,
wherein the operating unit is disposed entirely outside of a projection of the guide rail adjacent an interior of the tray.

23. The disc cartridge according to claim 22, wherein the fitting unit has an about L-shape.

24. The disc cartridge according to claim 22, wherein the first and second portions are disposed about perpendicular to one another.

25. The disc cartridge according to claim 22, wherein the second portion extends from the case about perpendicular to the case, and the first portion extends about perpendicular to the first portion.

26. The disc cartridge according to claim 25, wherein the void and the first portion have corresponding about rectangular cross sections.

27. The disc cartridge according to claim 26, wherein the second portion has an about rectangular cross section.

28. The disc cartridge according to claim 27, wherein the void is formed in a surface of the one of the trays opposite to a surface configured to hold the disc.

* * * * *